(12) United States Patent
Hannuksela

(10) Patent No.: US 12,610,048 B2
(45) Date of Patent: Apr. 21, 2026

(54) APPARATUS AND A METHOD FOR VIDEO CODING AND DECODING USING EXPLICITLY SIZED AND EVENLY SIZED PARTITIONS WITH CORRESPONDING SCAN ORDERS

(71) Applicant: Nokia Technologies Oy, Espoo (FI)

(72) Inventor: Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 142 days.

(21) Appl. No.: 17/614,735

(22) PCT Filed: May 22, 2020

(86) PCT No.: PCT/FI2020/050344
§ 371 (c)(1),
(2) Date: Nov. 29, 2021

(87) PCT Pub. No.: WO2020/245497
PCT Pub. Date: Dec. 10, 2020

(65) Prior Publication Data
US 2022/0232213 A1      Jul. 21, 2022

(30) Foreign Application Priority Data

Jun. 3, 2019    (FI) ..................................... 20195465

(51) Int. Cl.
*H04N 19/119*        (2014.01)
*H04N 19/169*        (2014.01)
(Continued)

(52) U.S. Cl.
CPC ......... *H04N 19/119* (2014.11); *H04N 19/172* (2014.11); *H04N 19/1883* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 9,386,305 B2 | 7/2016 | Chong et al. | |
| 2009/0052531 A1* | 2/2009 | Mulroy .................. | H04N 19/58 |
| | | | 375/E7.255 |

(Continued)

FOREIGN PATENT DOCUMENTS

| | | |
|---|---|---|
| CN | 106464934 A | 2/2017 |
| GB | 2526148 B | 6/2016 |

(Continued)

OTHER PUBLICATIONS

Wang et al., "AHG12: Signalling for tile and brick partitioning," Joint Video Experts Team (JVET) of ITU-T SG 16 WP 3 and ISO/IEC JTC 1/SC 29/WG 11, 14th Meeting: Geneva, CH Mar. 19-27, 2019, JVET-N0857-v1.*

(Continued)

*Primary Examiner* — Edemio Navas, Jr.
(74) *Attorney, Agent, or Firm* — McCarter & English, LLP

(57)        ABSTRACT

A method for video encoding or decoding comprising determining a number of units to be assigned to the partitions; indicating or inferring a number of explicitly sized partitions to be assigned; indicating sizes for or a number of units in the explicitly sized partitions; and indicating or inferring a number of evenly sized partitions to be assigned.

4 Claims, 11 Drawing Sheets a) 6K effective ERP scheme of OMAF clause D.6.3.
6×2 tile grid with tile column widths of 768, 768, 768, 768, 384, and 384 luma samples and tile row heights of 2048 and 256 luma samples b) 6K effective CMP scheme of OMAF clause D.6.4.
3×6 tile grid with tile column widths of 768, 768, and 384 luma samples and all tile row heights equal to 768 luma samples.

c) 6K effective CMP scheme.
6×3 tile grid with tile column widths of 768, 768, 768, 768, 384, and 384 luma samples and all tile row heights equal to 768 luma samples.

(51) Int. Cl.
    H04N 19/172      (2014.01)
    H04N 19/70       (2014.01)

(56)          References Cited

U.S. PATENT DOCUMENTS

| | | | |
|---|---|---|---|
| 2012/0243614 A1* | 9/2012 | Hong | H04N 19/52 |
| | | | 375/E7.026 |
| 2013/0202051 A1 | 8/2013 | Zhou | |
| 2014/0056355 A1* | 2/2014 | Li | H04N 19/127 |
| | | | 375/E7.243 |
| 2014/0341287 A1* | 11/2014 | Mody | H04N 19/82 |
| | | | 375/240.13 |
| 2015/0016543 A1* | 1/2015 | Rapaka | H04N 19/30 |
| | | | 375/240.25 |
| 2015/0016551 A1* | 1/2015 | Esenlik | H04N 19/463 |
| | | | 375/240.29 |
| 2015/0023406 A1 | 1/2015 | Lee et al. | |
| 2015/0110201 A1 | 4/2015 | Sasai et al. | |
| 2015/0131716 A1 | 5/2015 | Cho et al. | |
| 2015/0271510 A1* | 9/2015 | Wen | H04N 19/176 |
| | | | 375/240.02 |
| 2016/0156917 A1 | 6/2016 | Ugur et al. | 19/44 |
| 2020/0177922 A1* | 6/2020 | Chujoh | H04N 19/70 |
| 2022/0217342 A1* | 7/2022 | Hannuksela | H04N 19/129 |

FOREIGN PATENT DOCUMENTS

| | | |
|---|---|---|
| RU | 2538919 C2 | 1/2015 |
| WO | WO-2019/103126 A1 | 5/2019 |

OTHER PUBLICATIONS

Office action received for corresponding Japanese Patent Application No. 2021-571894, dated Apr. 6, 2023, 2 pages of office action and 3 pages of translation available.

Sjöberg et al., "AHG12: On Uniform Tile Partitioning", Ericsson, Joint Video Experts Team (JVET) of ITU-T SG 16 WP 3 and ISO/IEC JTC 1/SC 29/WG 11, JVET-N0498, 14th Meeting, Mar. 19-27, 2019, pp. 1-7.

Office action received for corresponding Vietnamese Patent Application No. 1-2021-08202, dated Jan. 21, 2022, 1 page of office action and 1 page of translation available.

"Versatile Video Coding", Series H: Audiovisual and Multimedia Systems Infrastructure of audiovisual services—Coding of moving video, Recommendation ITU-T H.266, Aug. 2020, 516 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 15: Advanced Video Coding (AVC) File Format", ISO/IEC 14496-15, First edition, Apr. 15, 2004, 29 pages.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.

"Advanced Video Coding for Generic Audiovisual services", Series H: Audiovisual And Multimedia Systems, Infrastructure of audiovisual services—Coding of moving Video, Recommendation ITU-T H.264, Apr. 2017, 812 pages.

"Information Technology—Coding of Audio-Visual Objects—Part 10: Advanced Video Coding", ISO/IEC 14496-10, Second edition, Oct. 1, 2004, 280 pages.

"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 182 pages.

Office action received for corresponding Finnish Patent Application No. 20195465, dated Jan. 30, 2020, 11 pages.

Wang et al., "AHG12: Signalling for tile and brick partitioning", Joint Video Experts Team (JVET) of ITU-T SG 16 WP 3 and ISO/IEC JTC 1/SC 29/WG 11, JVET-N0857-v1, 14th Meeting, Mar. 19-27, 2019, pp. 1-3.

Bross et al., "Versatile Video Coding (Draft 5)", Joint Video Experts Team (JVET) of ITU-T SG 16 WP 3 and ISO/IEC JTC 1/SC 29/WG 11, JVET-N1001-v7, 14th Meeting, Mar. 19-27, 2019, 383 pages.

International Search Report and Written Opinion received for corresponding Patent Cooperation Treaty Application No. PCT/FI2020/050344, dated Oct. 23, 2020, 17 pages.

Chan et al., "Improve load balancing and coding efficiency of tiles in high efficiency video coding by adaptive tile boundary", Journal of Electronic Imaging, vol. 26, No. 1, Jan./Feb. 2017, pp. 013006-1-013006-10.

Misra et al., "An Overview of Tiles in HEVC", IEEE Journal of Selected Topics in Signal Processing, vol. 7, No. 6, Dec. 2013, pp. 969-977.

Office action received for corresponding Canadian Patent Application No. 3142319, dated Jan. 12, 2023, 6 pages.

Office action received for corresponding Indian Patent Application No. 202147061885, dated Apr. 28, 2022, 7 pages.

Office action received for corresponding Russian Patent Application No. 2021137096, dated Aug. 12, 2022, 8 page of office action and 4 page of translation available.

Extended European Search Report received for corresponding European Patent Application No. 20819015.7, dated Jun. 5, 2023, 8 pages.

Hannuksela et al., "AHG17: On tile and brick signalling", Ericsson, Joint Video Experts Team (JVET) of ITU-T SG 16 WP 3 and ISO/IEC JTC 1/SC 29/WG 11, JVET-O0390, 15th Meeting, Jul. 3-12, 2019, 6 pages.

\* cited by examiner

□ CTU

□ Tile

□ Slice

⌐ ⌐ Brick

□ Tile

□ Slice

| | |
|---|---|
| single_tile_in_pic_flag | u(1) |
| if( !single_tile_in_pic_flag ) { | |
|    uniform_tile_spacing_flag | u(1) |
|    if( uniform_tile_spacing_flag ) { | |
|      tile_cols_width_minus1 | ue(v) |
|      tile_rows_height_minus1 | ue(v) |
|    } else { | |
|      num_tile_columns_minus1 | ue(v) |
|      num_tile_rows_minus1 | ue(v) |
|      for( i = 0; i < num_tile_columns_minus1; i++ ) | |
|        tile_column_width_minus1[ i ] | ue(v) |
|      for( i = 0; i < num_tile_rows_minus1; i++ ) | |
|        tile_row_height_minus1[ i ] | ue(v) |
|    } | |
|    brick_splitting_present_flag | u(1) |
|    for( i = 0; brick_splitting_present_flag && i < NumTilesInPic; i++ ) { | |
|      brick_split_flag[ i ] | u(1) |
|      if( brick_split_flag[ i ] ) { | |
|        uniform_brick_spacing_flag[ i ] | u(1) |
|        if( uniform_brick_spacing_flag[ i ] ) | |
|          brick_height_minus1[ i ] | ue(v) |
|        else { | |
|          num_brick_rows_minus1[ i ] | ue(v) |
|          for( j = 0; j < num_brick_rows_minus1[ i ]; j++ ) | |
|            brick_row_height_minus1[ i ][ j ] | ue(v) |
|          } | |
|        } | |
|      } | |
|    single_brick_per_slice_flag | u(1) |
|    if( !single_brick_per_slice_flag ) | |
|      rect_slice_flag | u(1) |
|    if( rect_slice_flag && !single_brick_per_slice_flag ) { | |
|      num_slices_in_pic_minus1 | ue(v) |
|      for( i = 0; i <= num_slices_in_pic_minus1; i++ ) { | |
|        if( i > 0 ) | |
|          top_left_brick_idx[ i ] | u(v) |
|          bottom_right_brick_idx_delta[ i ] | u(v) |
|        } | |
|      } | |

Fig.6

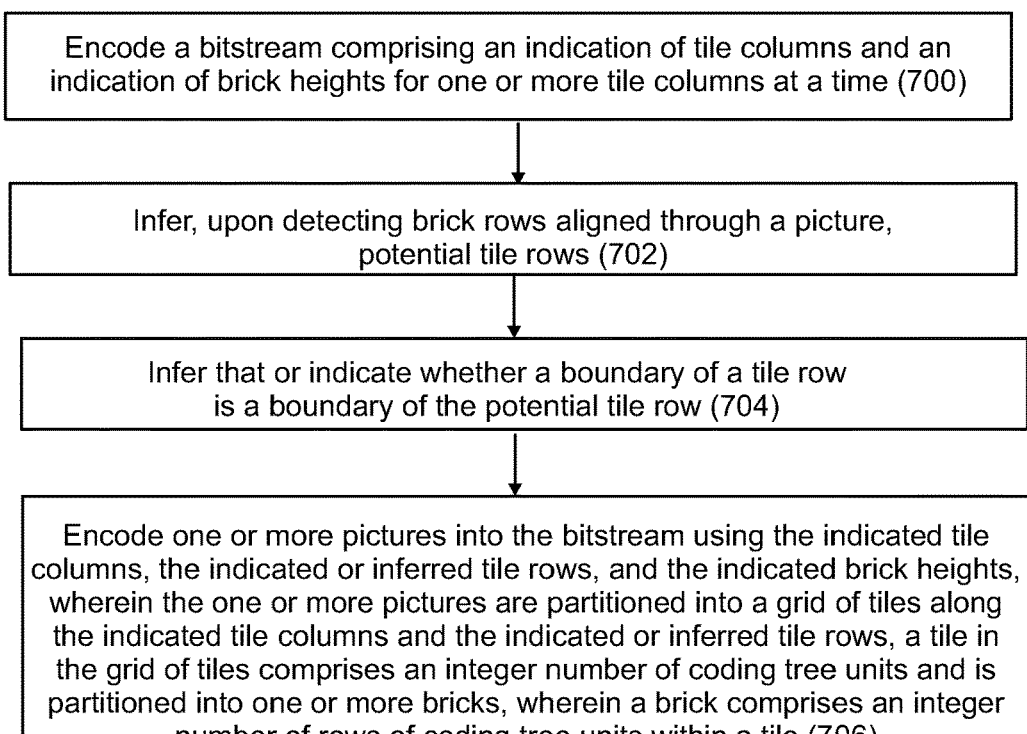

Encode a bitstream comprising an indication of tile columns and an indication of brick heights for one or more tile columns at a time (700)

Infer, upon detecting brick rows aligned through a picture, potential tile rows (702)

Infer that or indicate whether a boundary of a tile row is a boundary of the potential tile row (704)

Encode one or more pictures into the bitstream using the indicated tile columns, the indicated or inferred tile rows, and the indicated brick heights, wherein the one or more pictures are partitioned into a grid of tiles along the indicated tile columns and the indicated or inferred tile rows, a tile in the grid of tiles comprises an integer number of coding tree units and is partitioned into one or more bricks, wherein a brick comprises an integer number of rows of coding tree units within a tile (706)

Fig. 7

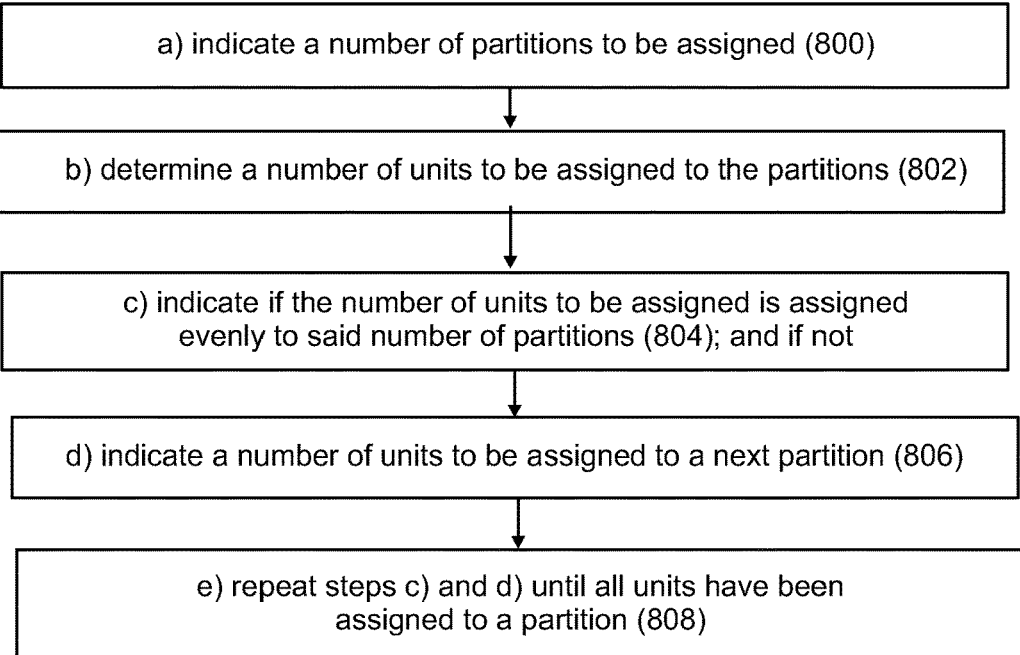

a) indicate a number of partitions to be assigned (800)

b) determine a number of units to be assigned to the partitions (802)

c) indicate if the number of units to be assigned is assigned evenly to said number of partitions (804); and if not d) indicate a number of units to be assigned to a next partition (806)

e) repeat steps c) and d) until all units have been assigned to a partition (808)

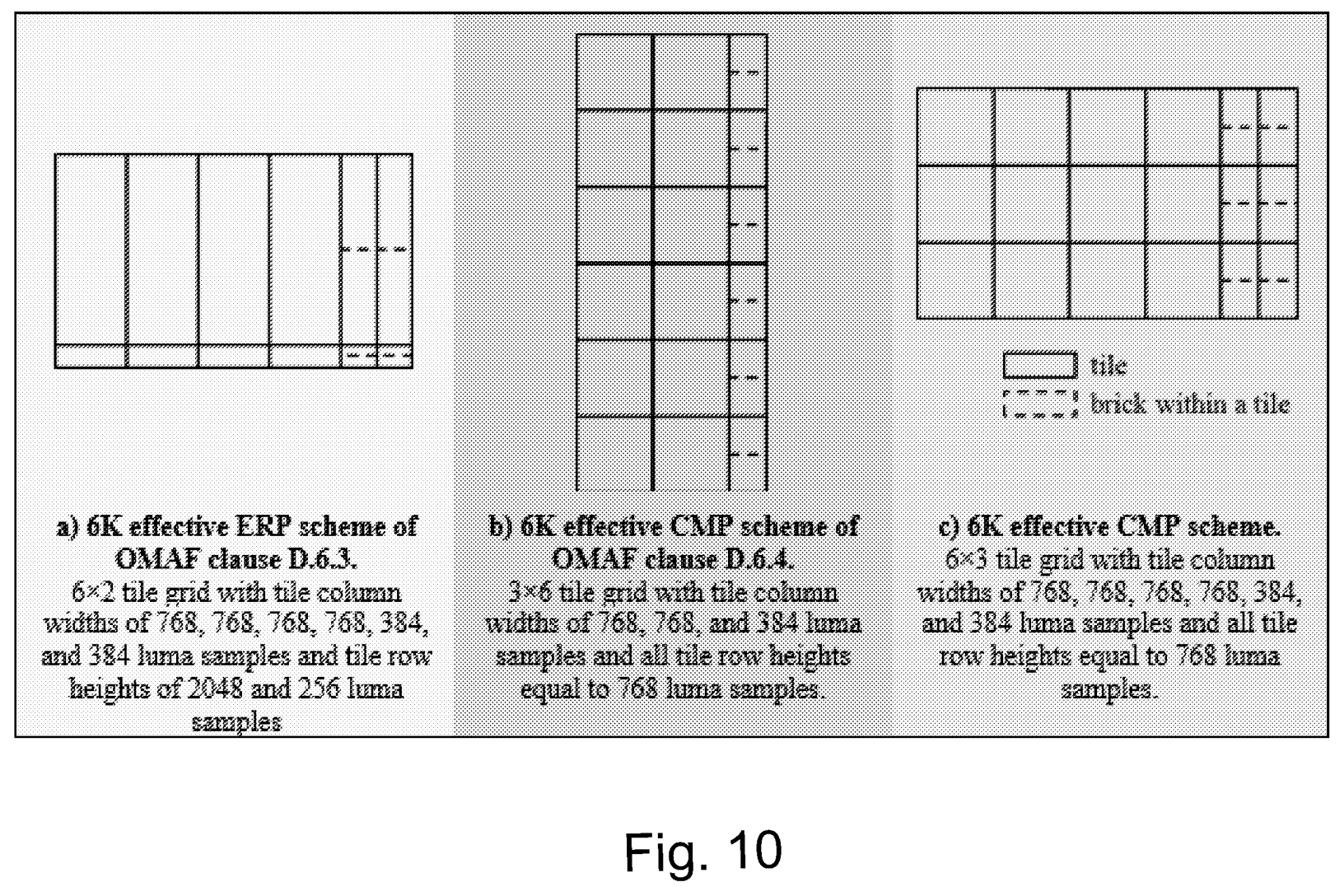

Fig. 8 tile brick within a tile a) 6K effective ERP scheme of OMAF clause D.6.3.
6×2 tile grid with tile column widths of 768, 768, 768, 384, and 384 luma samples and tile row heights of 2048 and 256 luma samples b) 6K effective CMP scheme of OMAF clause D.6.4.
3×6 tile grid with tile column widths of 768, 768, and 384 luma samples and all tile row heights equal to 768 luma samples c) 6K effective CMP scheme.
6×3 tile grid with tile column widths of 768, 768, 768, 768, 384, and 384 luma samples and all tile row heights equal to 768 luma samples

Fig. 10

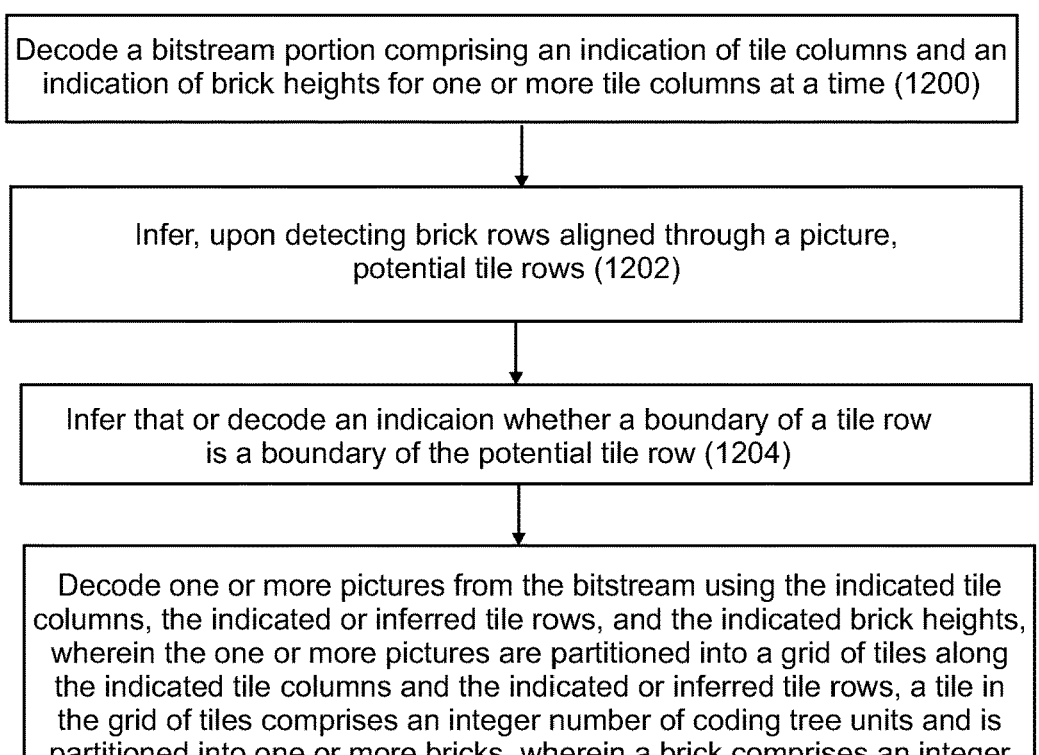

Decode a bitstream portion comprising an indication of tile columns and an indication of brick heights for one or more tile columns at a time (1200)

Infer, upon detecting brick rows aligned through a picture, potential tile rows (1202)

Infer that or decode an indicaion whether a boundary of a tile row is a boundary of the potential tile row (1204)

Decode one or more pictures from the bitstream using the indicated tile columns, the indicated or inferred tile rows, and the indicated brick heights, wherein the one or more pictures are partitioned into a grid of tiles along the indicated tile columns and the indicated or inferred tile rows, a tile in the grid of tiles comprises an integer number of coding tree units and is partitioned into one or more bricks, wherein a brick comprises an integer number of rows of coding tree units within a tile (1206)

Fig. 12

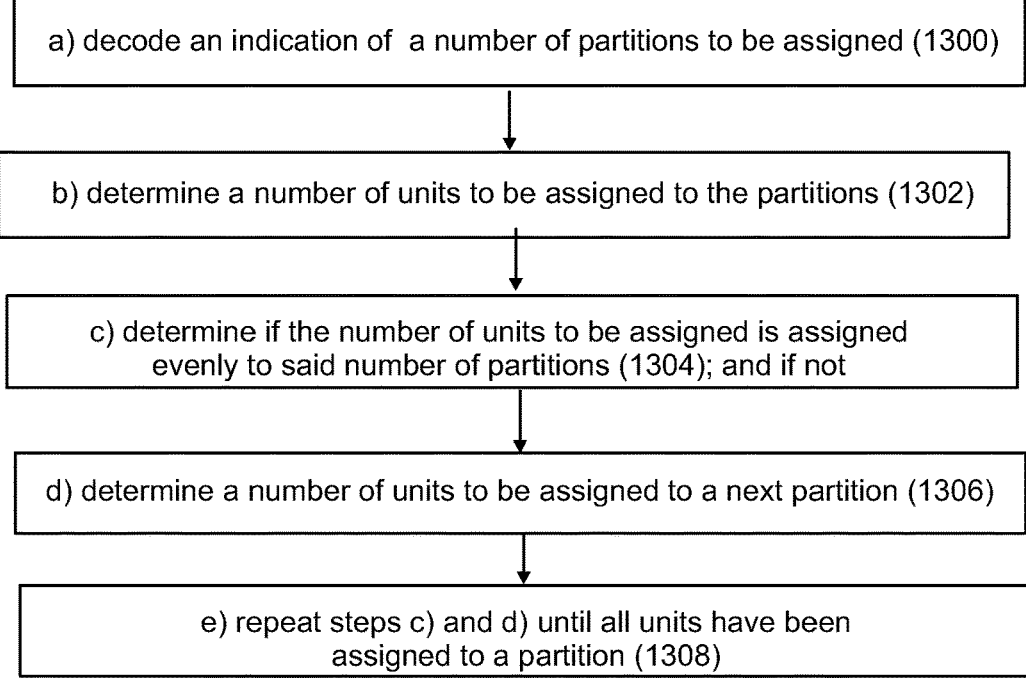

a) decode an indication of a number of partitions to be assigned (1300)

b) determine a number of units to be assigned to the partitions (1302)

c) determine if the number of units to be assigned is assigned evenly to said number of partitions (1304); and if not d) determine a number of units to be assigned to a next partition (1306)

e) repeat steps c) and d) until all units have been assigned to a partition (1308)

Fig. 13

APPARATUS AND A METHOD FOR VIDEO CODING AND DECODING USING EXPLICITLY SIZED AND EVENLY SIZED PARTITIONS WITH CORRESPONDING SCAN ORDERS

RELATED APPLICATION

This application claims priority to PCT Application No. PCT/FI2020/050344, filed on May 22, 2020, which claims priority to Finnish Application No. 20195465, filed on Jun. 3, 2019, each of which is incorporated herein by reference in its entirety.

TECHNICAL FIELD

The present invention relates to an apparatus, a method and a computer program for video coding and decoding.

BACKGROUND

Video coding standards and specifications typically allow encoders to divide, or partition, a coded picture to subsets. In video coding, a partitioning may be defined as a division of a picture or a subregion of a picture into subsets (blocks) such that each element of the picture or the subregion of the picture is in exactly one of the subsets (blocks). For example, H.265/HEVC introduced a concept of a coding tree unit (CTU) having a size of 64×64 pixels by default. A CTU can either contain a single coding unit (CU) or be recursively split into multiple smaller CUs, at minimum 8×8 pixels, based on the quadtree structure. H.265/HEVC also acknowledges tiles, which are rectangular and contain an integer number of CTUs, and slices, which are defined based on slice segments containing an integer number of coding tree units ordered consecutively in the tile scan and contained in a single NAL unit.

Versatile Video Coding (VVC) (MPEG-I Part 3), a.k.a. ITU-T H.266, is a video compression standard being developed by the Joint Video Experts Team (JVET) of the Moving Picture Experts Group (MPEG), (formally ISO/IEC JTC1 SC29 WG11) and Video Coding Experts Group (VCEG) of the International Telecommunication Union (ITU) to be the successor to HEVC/H.265. VVC partitioning scheme not only includes tiles, but also bricks, which may comprise one or more CTU rows within a tile. The introduction of bricks also affects the definition of slices.

As a consequence, a rather complex syntax structure has been created for signaling the various options for tile and brick partitioning, which is suboptimal in many aspects, especially regarding the bitrate required for said signaling.

SUMMARY

Now in order to at least alleviate the above problems, an enhanced encoding method is introduced herein.

A method according to a first aspect comprises encoding, in or along a bitstream, an indication of tile columns and an indication of brick heights for one or more tile columns at a time; inferring, upon detecting brick rows aligned through a picture, potential tile rows; inferring that or indicating whether a boundary of a potential tile row is a boundary of a tile row; and encoding one or more pictures into the bitstream using the indicated tile columns, the indicated or inferred tile rows, and the indicated brick heights, wherein the one or more pictures are partitioned into a grid of tiles along the indicated tile columns and the indicated or inferred tile rows, a tile in the grid of tiles comprises an integer number of coding tree units and is partitioned into one or more bricks, wherein a brick comprises an integer number of rows of coding tree units within a tile.

A method according to a second aspect comprises the steps of a) indicating a number of partitions to be assigned;

b) determining a number of units to be assigned to the partitions;

c) indicating if the number of units to be assigned is assigned evenly to said number of partitions; and if not, d) indicating a number of units to be assigned to a next partition, and e) repeating steps c) and d) until all units have been assigned to a partition.

According to an embodiment, said repeating steps c) and d) is carried out while the number of partitions yet to be assigned is greater than one.

According to an embodiment, the method further comprises determining if the number of units yet to be assigned is divisible by the number of partitions yet to be assigned; and if yes, indicating if the number of units yet to be assigned is assigned evenly to the number of partitions yet to be assigned.

According to an embodiment, if it is inferred or indicated that the number of units yet to be assigned is not assigned evenly to the number of partitions yet to be assigned, or the number of units yet to be assigned is not evenly divisible by the number of partitions yet to be assigned, step d) is followed by steps d1) reducing the number of units yet to be assigned to partitions by the indicated number; and d2) decrementing the number of partitions yet to be assigned by one.

According to an embodiment, the partitions are one or more of the following: tile columns, tile rows, brick rows of one or more tile columns, brick rows of a tile.

According to an embodiment, the units are rectangular blocks of samples of a picture.

An apparatus according to a third aspect comprises means for encoding, in or along a bitstream, an indication of tile columns and an indication of brick heights for one or more tile columns at a time; means for inferring, upon detecting brick rows aligned through a picture, potential tile rows; means for inferring that or indicating whether a boundary of a potential tile row is a boundary of a tile row; and means for encoding one or more pictures into the bitstream using the indicated tile columns, the indicated or inferred tile rows, and the indicated brick heights, wherein the one or more pictures are partitioned into a grid of tiles along the indicated tile columns and the indicated or inferred tile rows, a tile in the grid of tiles comprises an integer number of coding tree units and is partitioned into one or more bricks, wherein a brick comprises an integer number of rows of coding tree units within a tile.

An apparatus according to a fourth aspect comprises means for indicating a number of partitions to be assigned; means for determining a number of units to be assigned to the partitions; means for indicating if the number of units to be assigned is assigned evenly to said number of partitions; means for indicating, responsive to said number of units to be assigned is not to be assigned evenly to said number of partitions, a number of units to be assigned to a next partition, and means for repeating said indicating operations until all units have been assigned to a partition.

A method according to a fifth aspect comprises decoding, from or along a bitstream, an indication of tile columns and an indication of brick heights for one or more tile columns at a time; inferring, upon detecting brick rows aligned through a picture, potential tile rows; inferring that or indicating whether a boundary of a potential tile row is a boundary of a tile row; and decoding one or more pictures from the bitstream using the indicated tile columns, the indicated or inferred tile rows, and the indicated brick heights, wherein the one or more pictures are partitioned into a grid of tiles along the indicated tile columns and the indicated or inferred tile rows, a tile in the grid of tiles comprises an integer number of coding tree units and is partitioned into one or more bricks, wherein a brick comprises an integer number of rows of coding tree units within a tile.

A method according to a sixth aspect comprises the steps of a) decoding an indication of a number of partitions to be assigned;

b) determining a number of units to be assigned to the partitions;

c) determining if the number of units to be assigned is assigned evenly to said number of partitions; and if not, d) determining a number of units to be assigned to a next partition, and e) repeating steps c) and d) until all units have been assigned to a partition.

An apparatus according to a seventh aspect comprises means for decoding, from or along a bitstream, an indication of tile columns and an indication of brick heights for one or more tile columns at a time; means for inferring, upon detecting brick rows aligned through a picture, potential tile rows; means for inferring that or indicating whether a boundary of a potential tile row is a boundary of a tile row; and means for decoding one or more pictures from the bitstream using the indicated tile columns, the indicated or inferred tile rows, and the indicated brick heights, wherein the one or more pictures are partitioned into a grid of tiles along the indicated tile columns and the indicated or inferred tile rows, a tile in the grid of tiles comprises an integer number of coding tree units and is partitioned into one or more bricks, wherein a brick comprises an integer number of rows of coding tree units within a tile.

An apparatus according to an eighth aspect comprises means for decoding an indication of a number of partitions to be assigned; means for determining a number of units to be assigned to the partitions; means for determining if the number of units to be assigned is assigned evenly to said number of partitions; means for determining, responsive to said number of units to be assigned is not to be assigned evenly to said number of partitions, a number of units to be assigned to a next partition, and means for repeating said determining operations until all units have been assigned to a partition . . . .

Further aspects relate apparatuses comprising: at least one processor and at least one memory, said at least one memory stored with code thereon, which when executed by said at least one processor, causes an apparatus to perform at least the above methods and one or more of the embodiments related thereto.

BRIEF DESCRIPTION OF THE DRAWINGS

For better understanding of the present invention, reference will now be made by way of example to the accompanying drawings in which:

FIG. 6 shows the syntax structure for signaling of slice, tile and brick partitioning according to H.266/VVC Draft 5;

FIG. 7 shows a flow chart of an encoding method according to an aspect of the invention;

FIG. 8 shows a flow chart of an encoding method according to another aspect of the invention;

FIGS. 10a, 10b, 10c show some examples of tile and brick partitionings;

FIG. 12 shows a flow chart of a decoding method according to an embodiment of the invention;

FIG. 13 shows a flow chart of a decoding method according to another embodiment of the invention.

DETAILED DESCRIPTION OF SOME EXAMPLE EMBODIMENTS

Figure 1:
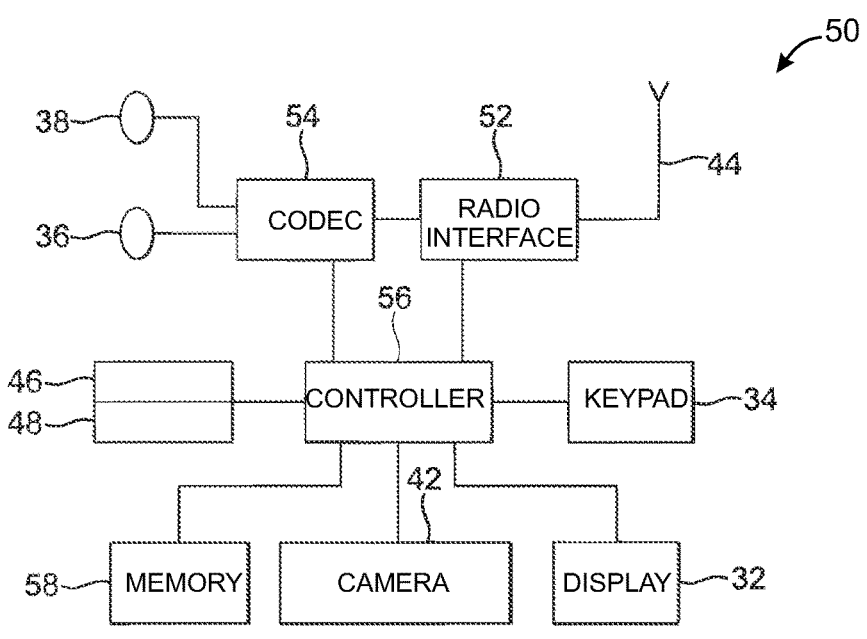
FIG. 1 shows schematically an electronic device employing embodiments of the invention.
Figure 2:
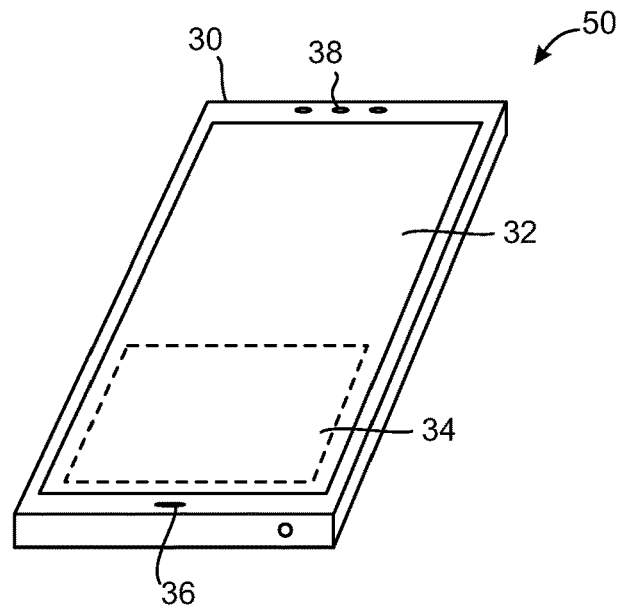
FIG. 2 shows schematically a user equipment suitable for employing embodiments of the invention.

The following describes in further detail suitable apparatus and possible mechanisms for initiating a viewpoint switch. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
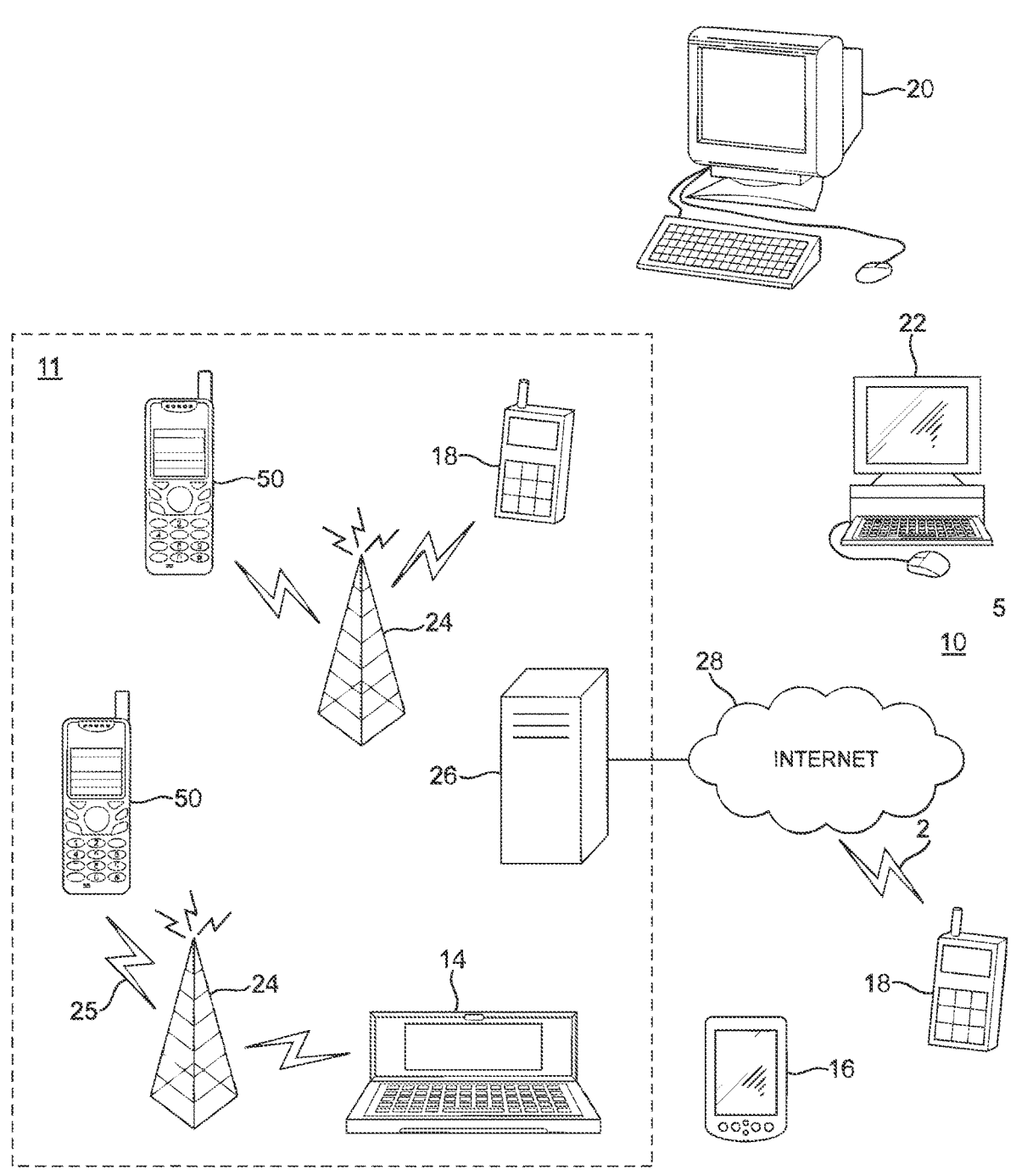
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can uncompress the compressed video representation back into a viewable form.

A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
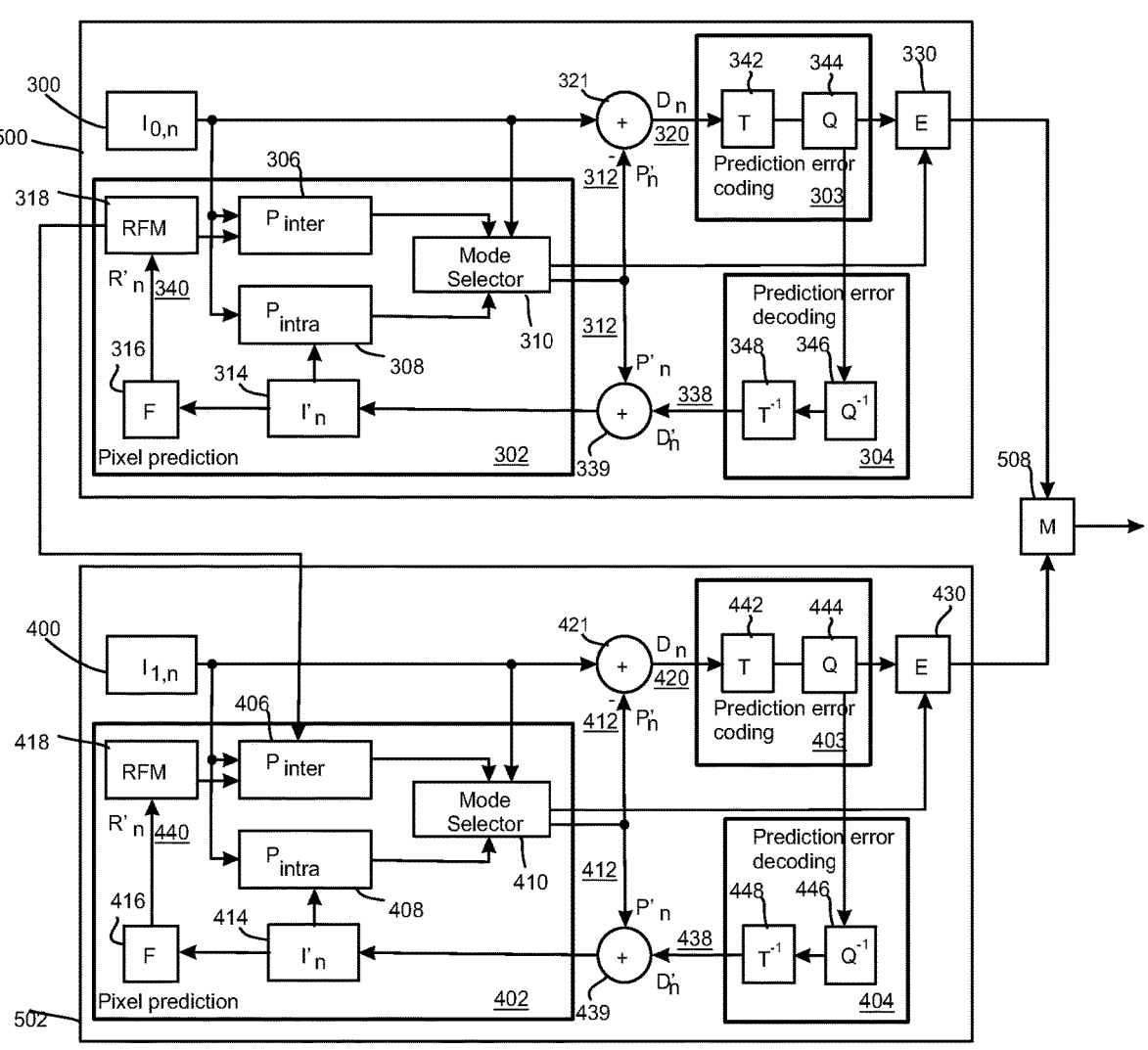
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification.

These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Versatile Video Coding (VVC) (MPEG-I Part 3), a.k.a. ITU H.266, is a video compression standard being developed by the Joint Video Exploration Team (JVET) of the MPEG consortium and the ITU to be a successor to HEVC/H.265.

Some key definitions, bitstream and coding structures, and concepts of H.264/AVC, HEVC, VVC, and some of their extensions are described in this section as an example of a video encoder, decoder, encoding method, decoding method, and a bitstream structure, wherein the embodiments may be implemented. The aspects of various embodiments are not limited to H.264/AVC or HEVC or VVC or their extensions, but rather the description is given for one possible basis on top of which the present embodiments may be partly or fully realized. Whenever VVC or any of its draft versions are referred to below, it needs to be understood that the description matches a VVC draft specification, that there might be changes in later draft versions and the finalized version(s) of VVC, and that descriptions and embodiments may be adjusted to match the finalized version(s) of VVC.

Video coding standards may specify the bitstream syntax and semantics as well as the decoding process for error-free bitstreams, whereas the encoding process might not be specified, but encoders may just be required to generate conforming bitstreams. Bitstream and decoder conformance may be verified with the Hypothetical Reference Decoder (HRD). The standards may contain coding tools that help in coping with transmission errors and losses, but the use of the tools in encoding may be optional and decoding process for erroneous bitstreams might not have been specified.

A syntax element may be defined as an element of data represented in the bitstream. A syntax structure may be defined as zero or more syntax elements present together in the bitstream in a specified order.

Each syntax element may described by its name and one descriptor for its method of coded representation. A convention where syntax element names comprise all lower case letters with underscore characters may be used. The decoding process of a video decoder may behave according to the value of the syntax element and to the values of previously decoded syntax elements.

When describing H.264/AVC, HEVC, VCC, and example embodiments, the following descriptors and/or description may be used to specify the parsing process of each syntax element.

u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.

ue(v): unsigned integer Exponential-Golomb-coded (a.k.a. exp-Golomb coded) syntax element with the left bit first.

An Exponential-Golomb bit string may be converted to a code number (codeNum) for example using the following table:

| Bit string | codeNum |
| --- | --- |
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

In some cases the syntax tables may use the values of other variables derived from syntax elements values. A variable naming convention where a mixture of lower case and upper case letter and without any underscore characters may be used. Variables starting with an upper case letter may be derived for the decoding of the current syntax structure and all depending syntax structures. Variables starting with an upper case letter may be used in the decoding process for later syntax structures without mentioning the originating syntax structure of the variable. A convention may be used where variables starting with a lower case letter may only be used within the context in which they are derived.

In some cases, "mnemonic" names for syntax element values or variable values are used interchangeably with their numerical values. Sometimes "mnemonic" names are used without any associated numerical values.

A flag may be defined as a variable or single-bit syntax element that can take one of the two possible values: 0 and 1.

Arrays may either be syntax elements or variables. Square parentheses may be used for the indexing of arrays. A one-dimensional array may be referred to as a list. A two-dimensional array may be referred to as a matrix.

Functions may be described by their names. A convention may be used in which function names start with an upper case letter, contain a mixture of lower and upper case letters without any underscore character, and end with left and right parentheses including zero or more variable names (for definition) or values (for usage) separated by commas (if more than one variable).

The function Ceil(x) may be defined to return the smallest integer greater than or equal to x. The function Log 2(x) may be defined to return the base-2 logarithm of x.

Processes may be specified for describing the decoding of syntax elements. A process may have a separate specification and invoking. It may be specified that all syntax elements and upper case variables that pertain to the current syntax structure and depending syntax structures are available in the process specification and invoking, and it may be also be specified that a process specification may also have a lower case variable explicitly specified as input. Each process specification may explicitly specify one or more outputs, each of which may be a variable that can either be an upper case variable or a lower case variable.

Syntax, semantics, and processes may be described with arithmetic, logical, relational, bit-wise, and assignment operators that are similar to those used in the C programming language. Especially, the operator/is used to indicate integer division (with truncation), and the operator % is used to indicate a modulus (i.e. a remainder of a division).

Numbering and counting conventions may begin from 0, e.g., "the first" is equivalent to the 0-th, "the second" is equivalent to the 1-th, etc.

An elementary unit for the input to an encoder and the output of a decoder, respectively, is typically a picture. A picture given as an input to an encoder may also be referred to as a source picture, and a picture decoded by a decoded may be referred to as a decoded picture or a reconstructed picture.

The source and decoded pictures are each comprised of one or more sample arrays, such as one of the following sets of sample arrays:

Luma (Y) only (monochrome).

Luma and two chroma (YCbCr or YCgCo).

Green, Blue and Red (GBR, also known as RGB).

Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of HEVC or alike. A component may be defined as an array or single sample from one of the three sample arrays (luma and two chroma) or the array or a single sample of the array that compose a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays.

Some chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

Coding formats or standards may allow to code sample arrays as separate color planes into the bitstream and respectively decode separately coded color planes from the bitstream. When separate color planes are in use, each one of them is separately processed (by the encoder and/or the decoder) as a picture with monochrome sampling.

Partitioning may be defined as a division of a set into subsets such that each element of the set is in exactly one of the subsets. In video coding, a partitioning may be defined as a division of a picture or a subregion of a picture into subsets such that each element of the picture or the subregion of the picture is in exactly one of the subsets. For example, in partitioning relating to HEVC encoding and/or decoding, and/or to VVC encoding and/or decoding the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

In HEVC, a CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In a draft version of H.266/VVC, the following partitioning applies. It is noted that what is described here might still evolve in later draft versions of H.266/VVC until the standard is finalized. Pictures are partitioned into CTUs similarly to HEVC, although the maximum CTU size has been increased to 128×128. A coding tree unit (CTU) is first partitioned by a quaternary tree (a.k.a. quadtree) structure. Then the quaternary tree leaf nodes can be further partitioned by a multi-type tree structure. There are four splitting types in multi-type tree structure, vertical binary splitting, horizontal binary splitting, vertical ternary splitting, and horizontal ternary splitting. The multi-type tree leaf nodes are called coding units (CUs). CU, PU and TU have the same block size, unless the CU is too large for the maximum transform length. A segmentation structure for a CTU is a quadtree with nested multi-type tree using binary and ternary splits, i.e. no separate CU, PU and TU concepts are in use except when needed for CUs that have a size too large for the maximum transform length. A CU can have either a square or rectangular shape.

An elementary unit for the output of encoders of some coding formats, such as VVC,v and the input of decoders of some coding formats, such as VVC is a Network Abstraction Layer (NAL) unit. For transport over packet-oriented networks or storage into structured files, NAL units may be encapsulated into packets or similar structures.

A byte stream format may be specified for NAL unit streams for transmission or storage environments that do not provide framing structures. The byte stream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the byte stream format is in use or not.

A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. The NAL unit header indicates the type of the NAL unit among other things.

NAL units can be categorized into Video Coding Layer (VCL) NAL units and non-VCL NAL units. VCL NAL units are typically coded slice NAL units.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure for example using an identifier.

Some types of parameter sets are briefly described in the following but it needs to be understood that other types of parameter sets may exist and that embodiments may be applied but are not limited to the described types of parameter sets. Parameters that remain unchanged through a coded video sequence may be included in a sequence parameter set (SPS). In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures. A header parameter set (HPS) has been proposed to contain such parameters that may change on picture basis.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A bitstream portion may be defined as a contiguous subset of a bitstream. In some contexts, it may be required that a bitstream portion consists of one or more entire syntax structures and no incomplete syntax structures. In other contexts, a bitstream portion may comprise any contiguous section of a bitstream and may contain incomplete syntax structure(s).

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded video sequence (CVS) may be defined as such a sequence of coded pictures in decoding order that is independently decodable and is followed by another coded video sequence or the end of the bitstream. A coded video sequence may additionally or alternatively be specified to end, when a specific NAL unit, which may be referred to as an end of sequence (EOS) NAL unit, appears in the bitstream.

Images can be split into independently codable and decodable image segments (e.g. slices and/or tiles and/or tile groups). Such image segments may enable parallel processing, "Slices" in this description may refer to image segments constructed of certain number of basic coding units that are processed in default coding or decoding order, while "tiles" may refer to image segments that have been defined as rectangular image regions along a tile grid. A tile group may be defined as a group of one or more tiles. Image segments may be coded as separate units in the bitstream, such as VCL NAL units in H.264/AVC and HEVC and VVC. Coded image segments may comprise a header and a payload, wherein the header contains parameter values needed for decoding the payload. The payload of a slice may be referred to as slice data.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

Accordingly, video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

In latest version of VVC, i.e. VVC Draft 5, the partitioning of pictures into slices, tiles and bricks is defined as follows.

A picture is divided into one or more tile rows and one or more tile columns. The partitioning of a picture to tiles forms a tile grid that may be characterized by a list of tile column widths (in CTUs) and a list of tile row heights (in CTUs).

A tile is a sequence of coding tree units (CTUs) that covers one "cell" in the tile grid, i.e., a rectangular region of a picture. A tile is divided into one or more bricks, each of which consisting of a number of CTU rows within the tile. A tile that is not partitioned into multiple bricks is also referred to as a brick. However, a brick that is a true subset of a tile is not referred to as a tile.

A slice either contains a number of tiles of a picture or a number of bricks of a tile. A slice is a VCL NAL unit.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

A brick scan may be defined as a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. It may be required e.g. in a coding standard that the coded slice NAL units shall be in the order of increasing CTU address in brick scan order for the first CTU of each coded slice NAL unit, wherein the CTU address may be defined to be increasing in CTU raster scan within a picture. Raster scan may be defined as a mapping of a rectangular two-dimensional pattern to a one-dimensional pattern such that the first entries in the one-dimensional pattern are from the first top row of the two-dimensional pattern scanned from left to right, followed similarly by the second, third, etc., rows of the pattern (going down) each scanned from left to right.

Figure 5A:
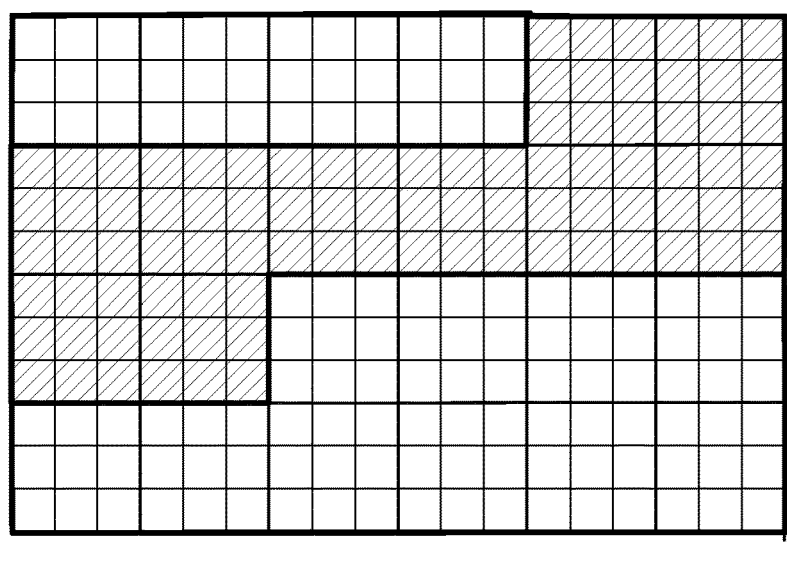
FIGS. 5a, 5b, 5c show some examples of partitioning a picture into coding tree units (CTU), tiles, bricks and slices.
Figure 5B:
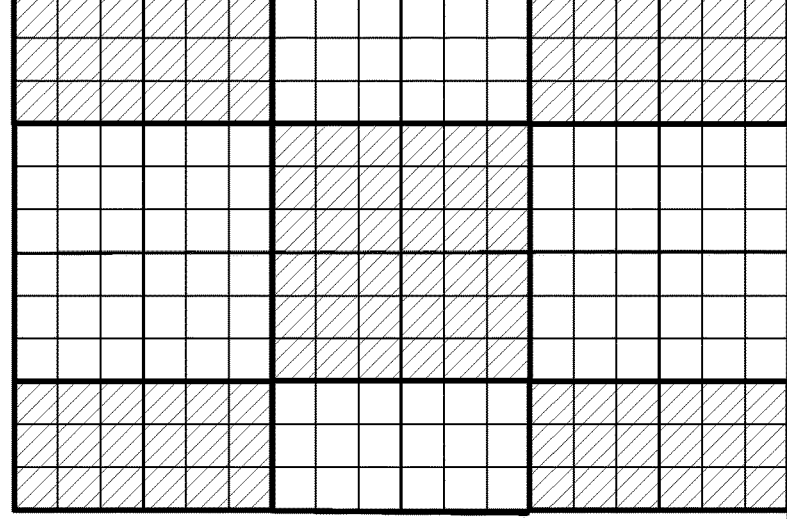
Figure 5C:
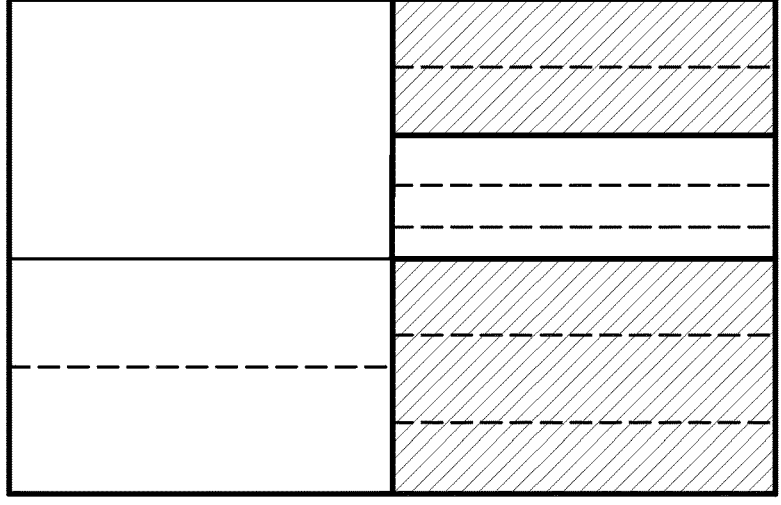

FIG. 5a shows an example of raster-scan slice partitioning of a picture, where the picture is divided into 12 tiles and 3 raster-scan slices. FIG. 5b shows an example of rectangular slice partitioning of a picture (with 18 by 12 CTUs), where the picture is divided into 24 tiles (6 tile columns and 4 tile rows) and 9 rectangular slices. FIG. 5c shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

Partitioning to tiles, bricks, and rectangular slices is specified in the picture parameter set (PPS). FIG. 6 shows the syntax for indicating partitioning to tiles and bricks, which is carried out in two phases: a tile grid (i.e., tile column widths and tile row heights) is provided as the first phase, and thereafter the indicated tiles are further partitioned to bricks.

There are two modes of indicating the tile grid: uniform (indicated with the syntax element uniform_tile_spacing_flag having value equal to 1) and explicit. In the uniform tile spacing, tiles have equal width with the possible exception of the rightmost tile column and equal height with the possible exception of the bottom-most tile row. In the explicit tile spacing, the widths and heights of the tile columns and rows (respectively) are indicated (in CTUs) except for the rightmost column and bottom-most row (respectively).

Similarly to how a tile grid is indicated, there are two modes for indicating how a tile is split into bricks, i.e., either uniform or explicit brick spacing can be indicated per tile. The signaling is similar to that for tile rows.

When rectangular slices are in use, the following is provided for each slice using the syntax structure including and following the syntax element num_slices_in_pic_minus1:

The top-left brick index (except for the first slice which is inferred to have index 0)

The differential brick index of the bottom-right brick of the slice relative to the top-left brick index.

The semantics of the syntax elements of FIG. 6 has been specified as follows in VVC Draft 5:

single_tile_in_pic_flag equal to 1 specifies that there is only one tile in each picture referring to the PPS. single_tile_in_pic_flag equal to 0 specifies that there is more than one tile in each picture referring to the PPS. NOTE—In absence of further brick splitting within a tile, the whole tile is referred to as a brick. When a picture contains only a single tile without further brick splitting, it is referred to as a single brick. It is a requirement of bitstream conformance that the value of single_tile_in_pic_flag shall be the same for all PPSs that are activated within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_tile_rows_minus1 and a list of syntax element pairs tile_column_width_minus1[i] and tile_row_height_minus1[i]. When not present, the value of uniform_tile_spacing_flag is inferred to be equal to 1.

tile_cols_width_minus1 plus 1 specifies the width of the tile columns excluding the right-most tile column of the picture in units of CTBs when uniform_tile_spacing_flag is equal to 1. The value of tile_cols_width_minus1 shall be in the range of 0 to PicWidthInCtbsY−1, inclusive. When not present, the value of tile_cols_width_minus1 is inferred to be equal to PicWidthInCtbsY−1.

tile_rows_height_minus1 plus 1 specifies the height of the tile rows excluding the bottom tile row of the picture in units of CTBs when uniform_tile_spacing_flag is equal to 1. The value of tile_rows_height_minus1 shall be in the range of 0 to PicHeightInCtbsY−1, inclusive. When not present, the value of tile_rows_height_minus1 is inferred to be equal to PicHeightInCtbsY−1.

num_tile_columns_minus1 plus 1 specifies the number of tile columns partitioning the picture when uniform_tile_spacing_flag is equal to 0. The value of num_tile_columns_minus1 shall be in the range of 0 to PicWidthInCtbsY−1, inclusive. If single_tile_in_pic_flag is equal to 1, the value of num_tile_columns_minus1 is inferred to be equal to 0. Otherwise, when uniform_tile_spacing_flag is equal to 1, the value of num_tile_columns_minus1 is inferred as specified in the CTB raster scanning, tile scanning, and brick scanning process.

num_tile_rows_minus1 plus 1 specifies the number of tile rows partitioning the picture when uniform_tile_spacing_flag is equal to 0. The value of num_tile_rows_minus1 shall be in the range of 0 to PicHeightInCtbsY−1, inclusive. If single_tile_in_pic_flag is equal to 1, the value of num_tile_rows_minus1 is inferred to be equal to 0. Otherwise, when uniform_tile_spacing_flag is equal to 1, the value of num_tile_rows_minus1 is inferred as specified in the CTB raster scanning, tile scanning, and brick scanning process. The variable NumTilesInPic is set equal to (num_tile_columns_minus1+1)*(num_tile_rows_minus1+1). When single_tile_in_pic_flag is equal to 0, NumTilesInPic shall be greater than 1.

tile_column_width_minus1[i] plus 1 specifies the width of the i-th tile column in units of CTBs.

tile_row_height_minus1[i] plus 1 specifies the height of the i-th tile row in units of CTBs.

brick_splitting_present_flag equal to 1 specifies that one or more tiles of pictures referring to the PPS may be divided into two or more bricks. brick_splitting_present_flag equal to 0 specifies that no tiles of pictures referring to the PPS are divided into two or more bricks.

brick_split_flag[i] equal to 1 specifies that the i-th tile is divided into two or more bricks. brick split flag[i] equal to 0 specifies that the i-th tile is not divided into two or more bricks. When not present, the value of brick_split_flag[i] is inferred to be equal to 0.

uniform_brick_spacing_flag[i] equal to 1 specifies that horizontal brick boundaries are distributed uniformly across the i-th tile and signalled using the syntax element brick_height_minus1[i]. uniform_brick_spacing_flag[i] equal to 0 specifies that horizontal brick boundaries may or may not be distributed uniformly across i-th tile and signalled using the syntax element num_brick_rows_minus1[i] and a list of syntax elements brick_row_height_minus1[i][j]. When not present, the value of uniform_brick_spacing_flag[i] is inferred to be equal to 1.

brick_height_minus1[i] plus 1 specifies the height of the brick rows excluding the bottom brick in the i-th tile in units of CTBs when uniform_brick_spacing_flag[i] is equal to 1. When present, the value of brick_height_minus1 shall be in the range of 0 to RowHeight[i]−2, inclusive. When not present, the value of brick_height_minus1[i] is inferred to be equal to RowHeight[i]−1.

num_brick_rows_minus1[i] plus 1 specifies the number of bricks partitioning the i-th tile when uniform_brick_spacing_flag[i] is equal to 0. When present, the value of num_brick_rows_minus1[i] shall be in the range of 1 to RowHeight[i]−1, inclusive. If brick_split_flag[i] is equal to 0, the value of num_brick_rows_minus1[i] is inferred to be equal to 0. Otherwise, when uniform_brick_spacing_flag[i] is equal to 1, the value of num_brick_rows_minus1[i] is inferred as specified in the CTB raster scanning, tile scanning, and brick scanning process.

brick_row_height_minus1[i][j] plus 1 specifies the height of the j-th brick in the i-th tile in units of CTBs when uniform_tile_spacing_flag is equal to 0.

The following variables are derived, and, when uniform_tile_spacing_flag is equal to 1, the values of num_tile_columns_minus1 and num_tile_rows_minus1 are inferred, and, for each i ranging from 0 to NumTilesInPic−1, inclusive, when uniform_brick_spacing_flag[i] is equal to 1, the value of num_brick_rows_minus1[i] is inferred, by invoking the CTB raster scanning, tile scanning, and brick scanning process:

the list RowHeight[j] for j ranging from 0 to num_tile_rows_minus1, inclusive, specifying the height of the j-th tile row in units of CTBs, the list CtbAddrRsToBs[ctbAddrRs] for ctbAddrRs ranging from 0 to PicSizeInCtbsY−1, inclusive, specifying the conversion from a CTB address in the CTB raster scan of a picture to a CTB address in the brick scan, the list CtbAddrBsToRs[ctbAddrBs] for ctbAddrBs ranging from 0 to PicSizeInCtbsY−1, inclusive, specifying the conversion from a CTB address in the brick scan to a CTB address in the CTB raster scan of a picture, the list BrickId[ctbAddrBs] for ctbAddrBs ranging from 0 to PicSizeInCtbsY−1, inclusive, specifying the conversion from a CTB address in brick scan to a brick ID, the list NumCtusInBrick[brickIdx] for brickIdx ranging from 0 to NumBricksInPic−1, inclusive, specifying the conversion from a brick index to the number of CTUs in the brick, the list FirstCtbAddrBs[brickIdx] for brickIdx ranging from 0 to NumBricksInPic−1, inclusive, specifying the conversion from a brick ID to the CTB address in brick scan of the first CTB in the brick.

single_brick_per_slice_flag equal to 1 specifies that each slice that refers to this PPS includes one brick. single_brick_per_slice_flag equal to 0 specifies that a slice that refers to this PPS may include more than one brick. When not present, the value of single_brick_per_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When single_brick_per_slice_flag is equal to 1, rect_slice_flag is inferred to be equal to 1.

num_slices_in_pic_minus1 plus 1 specifies the number of slices in each picture referring to the PPS. The value of num_slices_in_pic_minus1 shall be in the range of 0 to NumBricksInPic−1, inclusive. When not present and single_brick_per_slice_flag is equal to 1, the value of num_slices_in_pic_minus1 is inferred to be equal to NumBricksInPic−1.

top_left_brick_idx[i] specifies the brick index of the brick located at the top-left corner of the i-th slice. The value of top_left_brick_idx[i] shall not be equal to the value of top_left_brick_idx[j] for any i not equal to j. When not present, the value of top_left_brick_idx[i] is inferred to be equal to i. The length of the top_left_brick_idx[i] syntax element is Ceil(Log 2(NumBricksInPic) bits.

bottom_right_brick_idx_delta[i] specifies the difference between the brick index of the brick located at the bottom-right corner of the i-th slice and top_left_brick_idx[i]. When single_brick_per_slice_flag is equal to 1, the value of bottom_right_brick_idx_delta[i] is inferred to be equal to 0. The length of the bottom_right_brick_idx_delta[i] syntax element is Ceil(Log 2(NumBricksInPic−top_left_brick_idx[i])) bits.

It is a requirement of bitstream conformance that a slice shall include either a number of complete tiles or only a consecutive sequence of complete bricks of one tile. The variable NumBricksInSlice[i] and BricksToSliceMap[j], which specify the number of bricks in the i-th slice and the mapping of bricks to slices, are derived as follows:

```
NumBricksInSlice[ i ] = 0
botRightBkIdx = top_left_brick_idx[ i ] + bottom_right_brick_idx_delta[ i ]
for( j = 0; j < NumBricksInPic; j++) {
    if( BrickColBd[ j ] >= BrickColBd[ top_left_brick_idx[ i ] ] &&
        BrickColBd[ j ] <= BrickColBd[ botRightBkIdx ] &&
        BrickRowBd[ j ] >= BrickRowBd[ top_left_brick_idx[ i ] ] &&
```

-continued

```
        BrickRowBd[ j ] <= BrickColBd[ botRightBkIdx ] ) {
      NumBricksInSlice[ i ]++
      BricksToSliceMap[ j ] = i
    }
}
```

Thus, a rather complex syntax structure is intended for signalling the tile and brick partitioning. It is suboptimal in many aspects, for example in terms of number of syntax elements, lines in syntax, number of operation modes (i.e. separate uniform and explicit modes for both tiles and bricks, and tile and brick boundaries indicated separately) and bit count in signaling.

Now improved methods for signalling the tile and brick partitioning are introduced.

The method for encoding according to a first aspect, which is shown in FIG. 7, comprises encoding (700) a bitstream comprising an indication of tile columns and an indication of brick heights for one or more tile columns at a time, or encoding in or along a bitstream an indication of tile columns and an indication of brick heights for one or more tile columns at a time; inferring (702), upon detecting brick rows aligned through a picture, potential tile rows; inferring (704) that or indicating whether a boundary of a potential tile row is a boundary of a tile row; and encoding (706) one or more pictures into the bitstream using the indicated tile columns, the indicated or inferred tile rows, and the indicated brick heights, wherein the one or more pictures are partitioned into a grid of tiles along the indicated tile columns and the indicated or inferred tile rows, a tile in the grid of tiles comprises an integer number of coding tree units and is partitioned into one or more bricks, wherein a brick comprises an integer number of rows of coding tree units within a tile.

The method for decoding according to a first aspect comprises decoding, from or along a bitstream, an indication of tile columns and an indication of brick heights for one or more tile columns at a time; inferring, upon detecting brick rows aligned through a picture, potential tile rows; inferring that or decoding whether a boundary of a potential tile row is a boundary of a tile row; and decoding one or more pictures from the bitstream using the indicated tile columns, the indicated or inferred tile rows, and the indicated brick heights, wherein the one or more pictures are partitioned into a grid of tiles along the indicated tile columns and the indicated or inferred tile rows, a tile in the grid of tiles comprises an integer number of coding tree units and is partitioned into one or more bricks, wherein a brick comprises an integer number of rows of coding tree units within a tile.

Thus, tile columns and tile-column-wise brick heights are indicated by an encoder and/or decoded by a decoder, excluding tile row heights. Potential tile row boundaries are inferred to be those where brick boundaries are (horizontally) aligned through the picture. Thus, for a certain potential tile row boundary, it may be inferred that said potential tile row boundary is a tile row boundary. The inferring that a potential tile row boundary is a tile row boundary may be based on conclusions made of other information available in the syntax structure, or of absence of certain information from the syntax structure, for example absence of a particular flag.

Alternatively, it can be indicated by an encoder and/or decoded by a decoder whether a potential tile row boundary is a tile row boundary. The indication may be based e.g. one or more flags present in the syntax structure.

Hence, by indication only the tile columns and tile-column-wise brick heights and inferring the potential tile rows, the partitioning can be signaled without signaling the tile row heights. As a result, the coding efficiency is improved and the bitrate required for said signaling is reduced.

In the following, several exemplary embodiments for the first aspect, i.e. for the syntax and semantics for indicating tile columns and tile-column-wise brick heights and excluding tile row heights, are provided. Embodiments are equally applicable to encoding that generates a bitstream portion complying with the syntax and semantics and to decoding that decodes a bitstream portion according to the syntax and semantics.

Example 1 of Syntax and Semantics

| | Descriptor |
|---|---|
| pic_parameter_set_rbsp( ) { | |
| ... | |
| if( !single_tile_in_pic_flag ) { | |
| uniform_tile_col_spacing_flag | u(1) |
| if( uniform_tile_col_spacing_flag ) | |
| tile_cols_width_minus1 | ue(v) |
| else { | |
| num_tile_columns_minus1 | ue(v) |
| for( i = 0; i < num_tile_columns_minus1; i++ ) | |
| tile_column_width_minus1[ i ] | ue(v) |
| } | |
| for( i = 0; i < NumTileColsInPic; i++ ) { | |
| uniform_brick_spacing_flag[ i ] | u(1) |
| if( uniform_brick_spacing_flag[ i ] ) | |
| brick_height_minus1[ i ] | ue(v) |
| else { | |
| num_brick_rows_minus1[ i ] | ue(v) |
| for( j = 0; j < num_brick_rows_minus1[ i ]; j++ ) | |
| brick_row_height_minus1[ i ][ j ] | ue(v) |
| } | |
| } | |
| ... | | uniform_tile_col_spacing_flag equal to 1 specifies that tile column boundaries are distributed uniformly across the picture and signalled using the syntax element tile_cols_width_minus1. uniform_tile_spacing_flag equal to 0 specifies that tile column boundaries may or may not be distributed uniformly across the picture and are signalled using the syntax element num_tile_columns_minus1 and a list of syntax elements tile_column_width_minus1[i]. When not present, the value of uniform_tile_col_spacing_flag is inferred to be equal to 1.

The semantics of tile_cols_width_minus1, num_tile_columns_minus1, and tile_column_width_minus1[i] are specified identically to the semantics of the syntax elements with the same name in VVC Draft 5.

If uniform_tile_col_spacing_flag is equal to 1, NumTileColsInPic is set equal to PicWidthInCtbsY/(tile_cols_width_minus1+1)+PicWidthInCtbsY % (tile_cols_width- _minus1+1). Otherwise, NumTileColsInPic is set equal to num_tile_columns_minus1+1.

uniform_brick_spacing_flag[i] equal to 1 specifies that horizontal brick boundaries are distributed uniformly across the i-th tile column and signalled using the syntax element brick_height_minus1[i]. uniform_brick_spacing_flag[i] equal to 0 specifies that horizontal brick boundaries may or may not be distributed uniformly across i-th tile column and signalled using the syntax element num_brick_rows_minus1 [i] and a list of syntax elements brick_row_height_minus1 [i][j]. When not present, the value of uniform_brick_spacing_flag[i] is inferred to be equal to 1.

brick_height_minus1[i] plus 1 specifies the height of the brick rows excluding the bottom brick in the i-th tile column in units of CTBs when uniform_brick_spacing_flag[i] is equal to 1.

num_brick_rows_minus1[i] plus 1 specifies the number of bricks partitioning the i-th tile column when uniform_brick_spacing_flag[i] is equal to 0.

brick_row_height_minus1[i][j] plus 1 specifies the height of the j-th brick in the i-th tile column in units of CTBs when uniform_tile_spacing_flag is equal to 0.

Example 2 of Syntax and Semantics

Example 2 is like example 1 but additionally it is indicated by an encoder and/or decoded by a decoder whether the partitioning of a current tile column to bricks is identical to that of the previous tile column.

| | Descriptor |
|---|---|
| pic_parameter_set_rbsp( ) { | |
| ... | |
| if( !single_tile_in_pic_flag ) { | |
| uniform_tile_col_spacing_flag | u(1) |
| if( uniform_tile_col_spacing_flag ) | |
| tile_cols_width_minus1 | ue(v) |
| else { | |
| num_tile_columns_minus1 | ue(v) |
| for( i = 0; i < num_tile_columns_minus1; i++ ) | |
| tile_column_width_minus1[ i ] | ue(v) |
| } | |
| for( i = 0; i < NumTileColsInPic; i++ ) { | |
| if( i > 0 ) | |
| copy_previous_col_flag[ i ] | u(1) |
| if( i == 0 \| \| !copy_previous_col_flag[ i ] ) { | |
| uniform_brick_spacing_flag[ i ] | u(1) |
| if( uniform_brick_spacing_flag[ i ] ) | |
| brick_height_minus1[ i ] | ue(v) |
| else { | |
| num_brick_rows_minus1[ i ] | ue(v) |
| for( j = 0; j < num_brick_rows_minus1[ i ]; j++ ) | |
| brick_row_height_minus1[ i ][ j ] | ue(v) |
| } | |
| } | |
| } | |
| } | |
| ... | |

The semantics of the syntax elements is identical to that for Example 1 with the following addition of the semantics for copy_previous_col_flag[i]: copy_previous_col_flag[i] equal to 1 specifies all of the following:

uniform_brick_spacing_flag[i] is inferred to be equal to uniform_brick_spacing_flag[i−1].

When brick_height_minus1[i−1] is present, brick_height_minus1[i] is inferred to be equal to brick_height_minus1[i−1].

When num_brick_rows_minus1[i−1] is present, num_brick_rows_minus1[i] is inferred to be equal to num_ brick_rows_minus1[i−1] and brick_row_height_minus1[i][j] is inferred to be equal to brick_row_height_minus1[i−1][j] for each value of j in the range of 0 to num_brick_rows_minus1[i−1], inclusive.

On the other hand, the problem of suboptimal syntax structure of the VVC Draft 5 may be alleviated by an approach where tile column widths, tile row heights, or brick heights may be indicated by an encoder and/or decoded by a decoder in certain pre-defined scan order, until it is indicated or decoded (respectively) that the remaining tile columns, tile rows, or bricks (respectively) have equal dimension.

The method for encoding according to this second aspect is shown in FIG. 8, where the method comprises the steps of a) indicating (800) a number of partitions to be assigned; b) determining (802) a number of units to be assigned to the partitions; c) indicating (804) if the number of units to be assigned is assigned evenly to said number of partitions; and if not, d) indicating (806) a number of units to be assigned to a next partition, and e) repeating (808) steps c) and d) until all units have been assigned to a partition.

A method for decoding according to the second aspect comprises the steps of a) decoding a number of partitions to be assigned; b) determining a number of units to be assigned to the partitions; c) decoding if the number of units to be assigned is assigned evenly to said number of partitions; and if not, d) decoding a number of units to be assigned to a next partition, and e) repeating steps c) and d) until all units have been assigned to a partition.

According to an embodiment applicable to encoding and/or decoding, the number of units to be assigned to the partitions is one of the following: the picture width in CTUs (e.g. when partitions are tile columns), the picture height in CTUs (e.g. when partitions are tile rows, or when partitions are brick rows indicated for one or more complete tile columns at a time), the number of CTU rows in a tile (e.g. when partitions are bricks of the tile).

According to an embodiment applicable to encoding and/or decoding, the partitions are one or more of the following: tile columns, tile rows, brick rows.

According to an embodiment applicable to encoding and/or decoding, the units are rectangular blocks of samples of a picture. For example, a unit in the second aspect shown in FIG. 8 may be a coding tree block.

Hence, by indicating the number of units to be assigned to the partitions in a pre-defined scan order, significant savings in number of required syntax elements and in the bitrate required for said signaling may be achieved, especially if the number of units yet to be assigned shall be assigned evenly to the remaining partitions.

Figure 9:
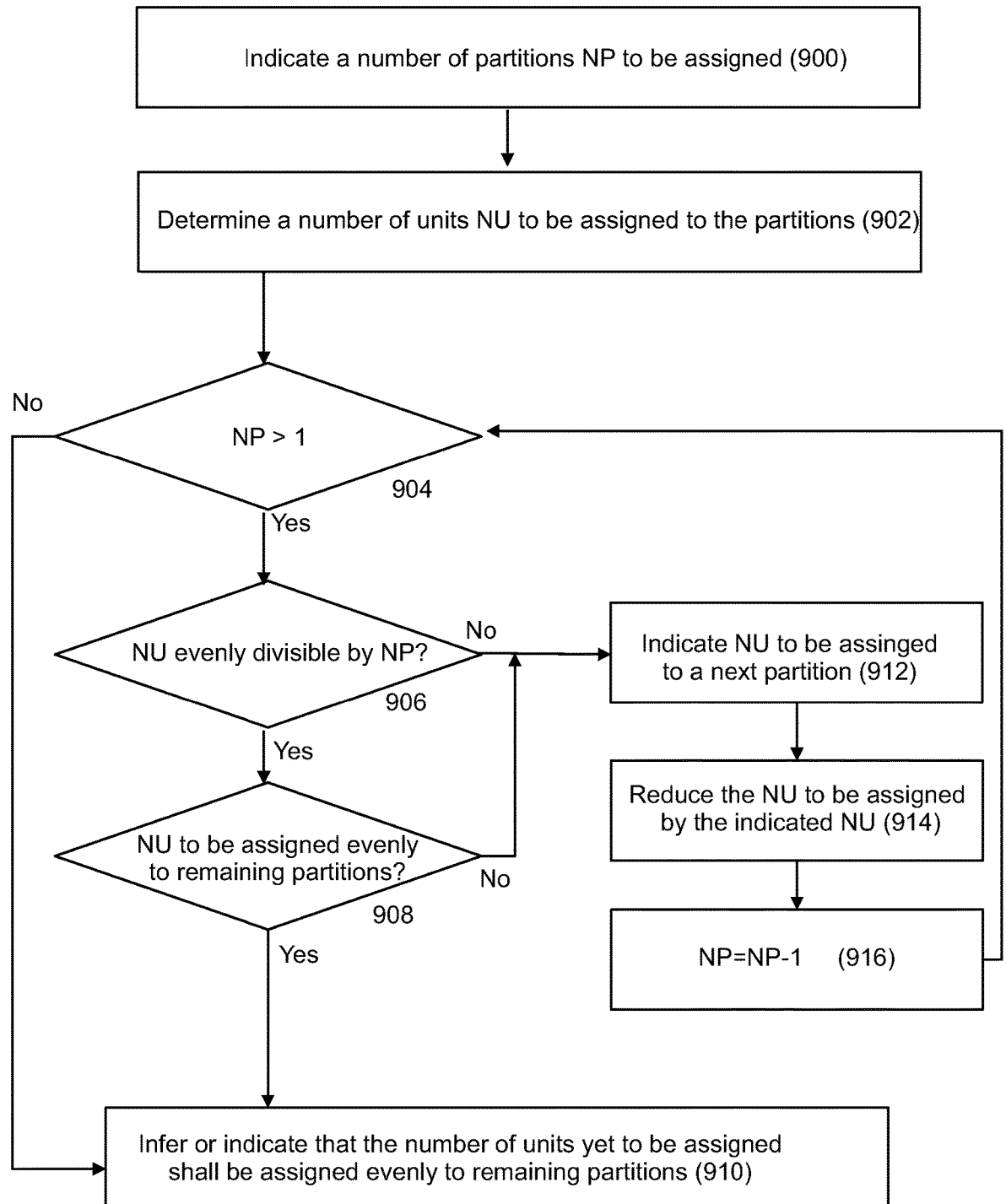
FIG. 9 shows a flow chart of an encoding method according to an embodiment of the invention.

FIG. 9 shows an example how the method of FIG. 8 may be implemented according to an embodiment. Thus, first a number of partitions, such as tile columns and/or tile rows, to be assigned is indicated (900) and a number of units NU, such as units of coding tree blocks (CTB), to be assigned to the partitions is determined (902). For creating a loop for checking that all units have been assigned to one partition, it is checked (904), if the number of partitions NP to be assigned is greater than one. If not, i.e. NP=1, it is inferred or indicated (910) that all remaining units yet to be assigned shall be assigned to the remaining partition.

However, if NP>1, it is checked (906), if the number of units NU to be assigned is evenly divisible by the number of partitions NP. If yes, it is determined (908) if the number of units NU shall be assigned evenly to the remaining partitions. If yes, it is inferred or indicated (910) that all remaining units yet to be assigned NU shall be assigned evenly to the remaining partition(s). If it is noticed that the number of units NU to be assigned is not evenly divisible by the number of partitions NP (906) or it is determined (908) that the number of units NU shall not be assigned evenly to the remaining partitions, a number of units to be assigned to the next partition in the pre-defined scanning order is indicated (912). The number of units NU to be assigned is reduced (914) by the indicated number of units to be assigned to said next partition, and the number of partitions NP to be assigned is decremented by one (916). Then it is looped back to check (904), if the number of partitions NP to be assigned is greater than one.

The method of FIG. 9 may be implemented similarly for decoding according to an embodiment described in the following. First, a number of partitions, such as tile columns and/or tile rows, to be assigned is decoded from or along a bitstream and a number of units NU, such as units of coding tree blocks (CTB), to be assigned to the partitions is determined. For creating a loop for checking that all units have number of units NU shall not be assigned evenly to the remaining partitions, a number of units to be assigned to the next partition in the pre-defined scanning order is decoded from or along the bitstream. The number of units NU to be assigned is reduced by the indicated number of units to be assigned to said next partition, and the number of partitions NP to be assigned is decremented by one. Then it is looped back to check if the number of partitions NP to be assigned is greater than one.

In the following, an exemplary embodiment for the second aspect, i.e. for the syntax and semantics for unified signalling of explicit/uniform tile/brick partitioning is provided. The embodiment is equally applicable to encoding that generates a bitstream portion complying with the syntax and semantics and to decoding that decodes a bitstream portion according to the syntax and semantics.

In this example, the unified signalling is used for specifying tile column width and tile row heights, while the signalling of bricks is unchanged when compared to VVC Draft 5.

|  | Descriptor |
|---|---|
| pic_parameter_set_rbsp( ) { | |
| ... | |
| if( !single_tile_in_pic_flag ) { | |
| num_tile_columns_minus1 | ue(v) |
| num_tile_rows_minus1 | ue(v) |
| for( i = num_tile_columns_minus1, remWidthInCtbsY = PicWidthInCtbsY; | |
| i > 0 && !rem_tile_col_equal_flag[ i ]; | |
| remWidthInCtbsY −= tile_column_width_minus1[ i ] + 1, i− − ) { | |
| if( remWidthInCtbsY % ( i + 1 ) = = 0 ) | |
| rem_tile_col_equal_flag[ i ] | u(1) |
| if( !rem_tile_col_equal_flag[ i ] ) | |
| tile_column_width_minus1[ i ] | ue(v) |
| } | |
| for( i = num_tile_rows_minus1, remHeightInCtbsY = PicHeightInCtbsY; | |
| i > 0 && !rem_tile_row_equal_flag[ i ]; | |
| remHeightInCtbsY −= tile_row_height_minus1[ i ] + 1, i− − ) { | |
| if( remHeightInCtbsY % ( i + 1 ) = = 0 ) | |
| rem_tile_row_equal_flag[ i ] | u(1) |
| if( !rem_tile_row_equal_flag[ i ] ) | |
| tile_row_height_minus1[ i ] | ue(v) |
| } | |
| brick_splitting_present_flag | u(1) |
| for( i = 0; brick_splitting_present_flag && i < NumTilesInPic; i++ ) { | |
| brick_split_flag[ i ] | u(1) |
| if( brick_split_flag[ i ] ) { | |
| uniform_brick_spacing_flag[ i ] | u(1) |
| if( uniform_brick_spacing_flag[ i ] ) | |
| brick_height_minus1[ i ] | ue(v) |
| else { | |
| num_brick_rows_minus1[ i ] | ue(v) |
| for( j = 0; j < num_brick_rows_minus1[ i ]; j++ ) | |
| brick_row_height_minus1[ i ][ j ] | ue(v) |
| } | |
| } | |
| } | |
| } | |
| ... | | been assigned to one partition, it is checked if the number of partitions NP to be assigned is greater than one. If not, i.e. NP=1, it is inferred or decoded from or along the bitstream that all remaining units yet to be assigned shall be assigned to the remaining partition.

However, if NP>1, it is checked if the number of units NU to be assigned is evenly divisible by the number of partitions NP. If yes, it is decoded from or along the bitstream if the number of units NU shall be assigned evenly to the remaining partitions. If it is noticed that the number of units NU to be assigned is not evenly divisible by the number of partitions NP or it is decoded from or along the bitstream that the rem_tile_col_equal_flag[i] equal to 0 specifies that the tile columns with index in the range of 0 to i, inclusive, may or may not have an equal width in units of CTBs. rem_tile_col_equal_flag[i] equal to 1 specifies that the tile columns with index in the range of 0 to i, inclusive, have an equal width in units of CTBs and tile_column_width_minus1[j] is inferred to be equal to remWidthInCtbsY/(i+1) for each value of j in the range of 0 to i, inclusive.

rem_tile_row_equal_flag[i] equal to 0 specifies that the tile rows with index in the range of 0 to i, inclusive, may or may not have an equal height in units of CTBs. rem_tile_row_equal_flag[i] equal to 1 specifies that the tile rows with index in the range of 0 to i, inclusive, have an equal height in units of CTBs and tile_row_height_minus1[j] is inferred to be equal to remHeightInCtbsY/(i+1) for each value of j in the range of 0 to i, inclusive.

The semantics of other syntax elements may be specified identically to the semantics of the syntax elements of the same name in VVC Draft 5.

In the following, an exemplary embodiment for a further aspect, i.e. for the syntax and semantics including both indicating tile columns and tile-column-wise brick heights and unified signaling of explicit/uniform tile/brick partitioning is provided. The embodiment is equally applicable to encoding that generates a bitstream portion complying with the syntax and semantics and to decoding that decodes a bitstream portion according to the syntax and semantics.

The exemplary embodiment for encoding can be summarized as follows, while the exemplary embodiment can be adapted for decoding by replacing the term indicating with the term decoding.

Tile columns are indicated as follows:

The number of tile columns is indicated (num_tile_columns_minus1).

The following is indicated in a loop that traverses tile columns from right to left until all tile columns have been traversed or until the remaining tile columns are indicated to have an equal width:

The following is indicated in a loop that traverses tile columns from left to right for rectangular slices and only includes one loop entry that specifies the tile row heights for raster-scan slices:

A flag if the brick partitioning of the tile column is identical to that of the previous tile column. The flag is not present for the left-most tile column (copy_previous_col_flag[i]). It is noted that this flag could be omitted in this exemplary embodiment or there are other alternatives discussed further below that can be used to achieve similar functionality as achieved by the flag.

When the tile brick partitioning of the tile column is not identical to that of the previous tile column, bricks of the tile column are indicated as follows:

The number of bricks in the tile column is indicated (num_bricks_minus1[i]).

The following is indicated in a loop that traverses bricks from bottom to top until all bricks of the tile column have been traversed or until the remaining bricks of the tile column are indicated to have an equal height:

If the remaining height (in units of CTBs) is divisible by the number of bricks yet to be specified, it is indicated if the remaining bricks have an equal height (rem_brick_height_equal_flag[i][j]).

If the remaining bricks do not have an equal height, the brick height is indicated (brick_height_minus1[i][j]).

The following syntax may be used in this exemplary embodiment:

| | Descriptor |
|---|---|
| pic_parameter_set_rbsp( ) { | |
| ... | |
|   if( !single_tile_in_pic_flag ) { | |
|     num_tile_columns_minus1 | ue(v) |
|     for( i = num_tile_columns_minus1, remWidthInCtbsY = PicWidthInCtbsY; | |
|       i > 0 && !rem_tile_col_equal_flag[ i ]; | |
|       remWidthInCtbsY −= tile_column_width_minus1[ i ] + 1, i− − ) { | |
|       if( remWidthInCtbsY % ( i + 1 ) = = 0 ) | |
|         rem_tile_col_equal_flag[ i ] | u(1) |
|       if( !rem_tile_col_equal_flag[ i ] ) | |
|         tile_column_width_minus1[ i ] | ue(v) |
|     } | |
|     single_brick_per_slice_flag | u(1) |
|     if( !single_brick_per_slice_flag ) | |
|       rect_slice_flag | u(1) |
|     for( i = 0; i <= num_tile_columns_minus1 * rect_slice_flag; i++ ) { | |
|       if( i > 0 ) | |
|         copy_previous_col_flag[ i ] | u(1) |
|       if( i = = 0 | | !copy_previous_col_flag[ i ] ) { | |
|         num_bricks_minus1[ i ] | ue(v) |
|         for( j = num_bricks_minus1[ i ], remHeightInCtbsY = PicHeightInCtbsY; | |
|           j > 0 && !rem_brick_height_equal[ i ][ j ]; | |
|           remHeightInCtbsY −= brick_height_minus1[ i ][ j ] + 1, j− − ) { | |
|           if( remHeightInCtbsY % ( j + 1 ) = = 0 ) | |
|             rem_brick_height_equal_flag[ i ][ j ] | u(1) |
|           if( !rem_brick_height_equal_flag[ i ][ j ] ) | |
|             brick_height_minus1[ i ][ j ] | ue(v) |
|         } | |
|       } | |
|     } | |
|   } | |
|   ... | |

If the remaining width (in units of CTBs) is evenly divisible by the number of tile columns yet to be specified, it is indicated if the remaining tile columns have an equal width (rem_tile_col_equal_flag[i]).

If the remaining tile columns do not have an equal width, the tile column width is indicated (tile_column_width_minus1[i]).

num_tile_columns_minus1 plus 1 specifies the number of tile columns partitioning the picture when uniform_tile_spacing_flag is equal to 0. The value of num_tile_columns_minus1 shall be in the range of 0 to PicWidthInCtbsY−1, inclusive. When single_tile_in_pic_flag is equal to 1, the value of num_tile_columns_minus1 is inferred to be equal to 0.

rem_tile_col_equal_flag[i] equal to 0 specifies that the tile columns with index in the range of 0 to i, inclusive, may or may not have an equal width in units of CTBs. rem_tile_col_equal_flag[i] equal to 1 specifies that the tile columns with index in the range of 0 to i, inclusive, are inferred to have an equal width in units of CTBs. When not present, the value of rem_tile_col_equal_flag[i] is inferred to be equal to 0.

tile_column_width_minus1[i] plus 1 specifies the width of the i-th tile column in units of CTBs.

copy_previous_col_flag[i] equal to 0 specifies that num_bricks_minus1[i] is present. copy_previous_col_flag[i] equal to 1 specifies all of the following:

num_bricks_minus1[i] is inferred to be equal to num_bricks_minus1[i−1], rem_brick_height_equal_flag[i][j] is inferred to be equal to rem_brick_height_equal_flag[i−1][j] for all such values of j in the range of 1 to num_bricks_minus1[i], inclusive, for which the value of rem_brick_height_equal_flag[i−1][j] is present or inferred.

brick_height_minus1[i][j] is inferred to be equal to brick_height_minus1[i−1][j] for all such values of j in the range of 1 to num_bricks_minus1[i], inclusive, for which the value of brick_height_minus1[i−1][j] is present.

copy_previous_col_flag[i] equal to 0 specifies that num_bricks_minus1[i] is present. copy_previous_col_flag[i] equal to 1 specifies all of the following:

num_bricks_minus1[i] is inferred to be equal to num_bricks_minus1[i−1], rem_brick_height_equal_flag[i][j] is inferred to be equal to rem_brick_height_equal_flag[i−1][j] for all such values of j in the range of 1 to num_bricks_minus1[i], inclusive, for which the value of rem_brick_height_equal_flag[i−1][j] is present or inferred.

brick_height_minus1[i][j] is inferred to be equal to brick_height_minus1[i−1][j] for all such values of j in the range of 1 to num_bricks_minus1[i], inclusive, for which the value of brick_height_minus1[i−1][j] is present.

rem_brick_height_equal_flag[i][j] equal to 0 specifies that the bricks with index in the range of 0 to j, inclusive, within the i-th tile column may or may not have an equal height in units of CTBs. rem_brick_height_equal_flag[i][j] equal to 1 specifies that bricks with index in the range of 0 to j, inclusive, within the i-th tile column are inferred to have an equal height in units of CTBs. When not present, the value of rem_brick_height_equal_flag[i][j] is inferred to be equal to 0.

brick_height_minus1[i][j] plus 1 specifies the height of the j-th brick within the i-th tile column in units of CTBs.

The semantics of other syntax elements may be specified identically to the semantics of the syntax elements with the same names in VVC Draft 5.

The decoding process may use variables defined as follows or similarly to the following:

The list colWidth[i] for i ranging from 0 to num_tile_columns_minus1, inclusive, specifying the width of the i-th tile column in units of CTBs, is derived as follows:

```
for( i = num_tile_columns_minus1, remWidthInCtbsY =
PicWidthInCtbsY;
        i > 0 && !rem_tile_col_equal_flag[ i ];
        remWidthInCtbsY −= tile_column_width_minus1[ i ] + 1,
        i− − )
    if( !rem_tile_col_equal_flag[ i ] )
        colWidth[ i ] = tile_column_width_minus1[ i ] + 1
if( i > 0 )
    for( j = i; j >= 0; j− − )
        colWidth[ j ] = remWidthInCtbsY / ( i + 1 )
else
    colWidth[ 0 ] = remWidthInCtbsY
```

The lists colBrickHeight[i][j] for i ranging from 0 to num_tile_columns_minus1, inclusive, and j ranging from 0 to num_bricks_minus1[i], inclusive, specifying the height of the j-th brick row in units of CTBs within the i-th tile column, list RowHeight[j] for j ranging from 0 to NumTileRows−1, inclusive, specifying the height of the j-th tile row in units of CTBs, the list tileRowBd[j] for j ranging from 0 to NumTileRows, inclusive, specifying the location of the j-th tile row boundary in units of CTBs, the value NumTileRows, and the value of NumTilesInPic are derived as follows:

```
for( i = 0, i <= num_tile_columns_minus1; i++ ) {
    for( j = num_bricks_minus1[ i ], remHeightInCtbsY = PicHeightInCtbsY;
            j > 0 && !rem_brick_height_equal[ i ][ j ];
            remHeightInCtbsY −= brick_height_minus1[ i ][ j ] + 1, j− − )
        if( !rem_brick_height_equal_flag[ i ][ j ] )
            colBrickHeight[ i ][ j ] = brick_height_minus1[ i ][ j ] + 1
    if( j > 0 )
        for( k = j; k >= 0; k− − )
            colBrickHeight[ i ][ j ] = remHeightInCtbsY / ( j + 1 )
    else
        colBrickHeight[ i ][ 0 ] = remHeightInCtbsY
}
for( i = 0, tileRow = 0, currBrickBd = colBrickHeight[ 0 ][ 0 ], tileRowBd[ 0 ] = 0; i <=
num_bricks_minus1[ 0 ];
        i++, currBrickBd += colBrickHeight[ 0 ][ i ] ) {
    tileCol = 1
    matchingBdFlag = 1
    while( tileCol <= num_tile_columns_minus1 && matchingBdFlag )
        brickIdxInCol = 0
        brickBdInCol = colBrickHeight[ tileCol ][ 0 ]
        while( brickBdInCol < currBrickBd && brickIdxInCol <=
num_bricks_minus1[ tileCol ] ) {
            brickIdxInCol++
            brickBdInCol += colBrickHeight[ tileCol ][ brickIdxInCol ]
        }
```

-continued

```
    if( brickBdInCol = = currBrickBd )
        tileCol++
    else
        matchingBdFlag = 0
    }
    if( matchingBdFlag ) {
        tileRowBd[ tileRow + 1 ] = currBrickBd
        RowHeight[ tileRow ] = currBrickBd − tileRowBd[ tileRow ]
        tileRow++
    }
}
NumTileRows = tileRow
NumTilesInPic = NumTileRows * (num_tile_columns_minus1 + 1 )
```

When single_tile_in_pic_flag is equal to 0, NumTilesIn-Pic shall be greater than 1. The list tileColBd[i] for i ranging from 0 to num_tile_columns_minus1+1, inclusive, specifying the location of the i-th tile column boundary in units of CTBs, is derived as follows:

```
for( tileColBd[ 0 ] = 0, i = 0; i <= num_tile_columns_minus1; i++ )
    tileColBd[ i + 1 ] = tileColBd[ i ] + colWidth[ i ]
```

The variable NumBricksInPic, specifying the number of bricks in a picture referring to the PPS, and the lists BrickColBd[brickIdx], BrickRowBd[brickIdx], BrickWidth[brickIdx], and BrickHeight[brickIdx] for brickIdx ranging from 0 to NumBricksInPic−1, inclusive, specifying the locations of the vertical brick boundaries in units of CTBs, the locations of the horizontal brick boundaries in units of CTBs, the widths of the brick columns in units of CTBs, and the heights of brick columns in units of CTBs, are derived, and for each i ranging from 0 to NumTilesInPic−1, inclusive, when uniform_brick_spacing_flag[i] is equal to 1, the value of num_brick_rows_minus1[i] is inferred, as follows:

```
for( i = 0; i <= num_tile_columns_minus1; i++ )
    colBrickIdx[ i ] = 0
for ( brickIdx = 0, i = 0; i < NumTilesInPic; i++ ) {
    tileX = i % ( num_tile_columns_minus1 + 1 )
    tileY = i / ( num_tile_columns_minus1 + 1 )
    do {
        BrickColBd[ brickIdx ] = tileColBd[ tileX ]
        BrickRowBd[ brickIdx ] = colBrickBd[ colBrickIdx[ tileX ] ]
        BrickWidth[ brickIdx ] = colWidth[ tileX ]
        BrickHeight[ brickIdx ] = colBrickHeight[ colBrickIdx[ tileX ] ]
        colBrickIdx[ tileX ]++
        brickIdx++
    while( tileRowBd[ tileY + 1 ] <= colBrickBd[ colBrickIdx[ tileX ] ] )
}
NumBricksInPic = brickIdx
```

According to an embodiment, a method for encoding comprises the steps of a) determining a number of units to be assigned to the partitions; b) indicating or inferring a number of explicitly sized partitions to be assigned; c) indicating sizes for or a number of units in the explicitly sized partitions; and d) indicating or inferring a number of evenly sized partitions to be assigned.

According to an embodiment, a method for decoding comprises the steps of a) determining a number of units to be assigned to the partitions; b) decoding or inferring a number of explicitly sized partitions to be assigned; c) decoding sizes for or a number of units in the explicitly sized partitions; and d) decoding or inferring a number of evenly sized partitions to be assigned.

According to an embodiment applicable to encoding and/or decoding, the number of units to be assigned to the partitions is one of the following: the picture width in CTUs (e.g. when partitions are tile columns), the picture height in CTUs (e.g. when partitions are tile rows, or when partitions are brick rows indicated for one or more complete tile columns at a time), the number of CTU rows in a tile (e.g. when partitions are bricks of the tile).

According to an embodiment applicable to encoding and/or decoding, the partitions are one or more of the following: tile columns, tile rows, brick rows.

According to an embodiment applicable to encoding and/or decoding, step d comprises determining the number of units yet to be assigned to the partitions by decrementing the number of units in the explicitly sized partitions from the number of units to be assigned to the partitions, and the method further comprises:

assigning partitions to the explicitly sized partitions according to the sizes for or the number of units in the explicitly sized partitions and according to a pre-defined or indicated/decoded scan order;

assigning partitions to the evenly sized partitions by dividing the units yet to be assigned to the partitions by the number of evenly sized partitions and according to a pre-defined or indicated/decoded scan order.

According to an embodiment applicable to encoding and/or decoding, the number of explicitly sized partitions is indicated in and/or decoded from a higher-level syntax structure (e.g. SPS), while sizes for the explicitly sized partitions and/or a number of evenly sized partitions to be assigned may be indicated in and/or decoded from a lower-level syntax structure (e.g. PPS).

According to an embodiment, it is inferred (e.g. pre-determined in a coding standard) that the number of explicitly sized partitions is equal to 1.

According to an embodiment applicable to encoding and/or decoding, step d comprises:

determining a set or a list of partition sizes to which the number of units yet to be assigned can be evenly divided;

if the number of items in the set or the list is equal to 1, inferring the number evenly sized partitions to be equal to 1;

indicating and/or decoding an index (or alike) corresponding to an item in the set or list, where the index is indicative of the number of evenly sized partitions to be assigned.

According to an embodiment applicable to encoding and/or decoding the set or the list of partition sizes to which the number of units yet to be assigned can be evenly divided is constrained by excluding partition sizes smaller than a threshold, wherein the threshold may be pre-defined e.g. in a coding standard or indicated/decoded. For example, a minimum tile column width in CTUs may be pre-defined or indicated/decoded.

According to an embodiment, the index corresponding to an item in the set or list is coded with a fixed-length codeword, e.g. u(v), wherein the length of the codeword is determined by the number of items in the set or list.

Indicating Whether a Boundary of a Tile Row is a Boundary of the Potential Tile Row In some embodiments, a tile row boundary is inferred when horizontal brick boundaries are aligned across the picture. This section presents an embodiment for signalling tile row boundaries. The embodiment may be applied together with any embodiment where brick boundaries are indicated prior to tile row boundaries in the syntax.

The embodiment may comprise one or more of the following steps (some of which have already been described earlier):

Potential tile row boundaries are inferred to be those where brick boundaries are (horizontally) aligned through the picture.

It is inferred by an encoder in or along the bitstream and/or decoded by a decoder from or along the bitstream whether all aligned brick boundaries form tile row boundaries. For example, a flag in the bitstream syntax may be used.

If all aligned brick boundaries do not form tile row boundaries, it is indicated by an encoder in or along the bitstream and/or decoded by a decoder from or along the bitstream for each aligned brick boundary whether that boundary is a tile row boundary. For example, a flag may be present in the bitstream syntax for each aligned brick boundary (excluding aligned brick boundaries that are picture boundaries).

For example, the following syntax may be used:

|  | Descriptor |
|---|---|
| pic_parameter_set_rbsp( ) { | |
| ... | |
|   if( rect_slice_flag ) { | |
|     explicit_tile_rows_flag | u(1) |
|     if( explicit_tile_rows_flag ) | |
|       for( i = 1; i < NumAlignedBrickRows; i++ ) | |
|         tile_row_flag[ i ] | u(1) |
|   } | |
|   ... | |

NumAlignedBrickRows may be derived like NumTile-Rows in another embodiment.

The semantics of the presented syntax elements may be specified as follows:

explicit_tile_rows_flag equal to 0 specifies that a tile row boundary is inferred whenever horizontal brick boundaries are aligned across the picture. explicit_tile_rows_flag equal to 1 specifies that tile_row_flag[i] syntax elements are present.

tile_row_flag[i] equal to 0 specifies that the i-th such horizontal boundary where horizontal brick boundaries are aligned across a picture is not a tile row boundary. tile_row_flag[i] equal to 1 specifies that the i-th such horizontal boundary where horizontal brick boundaries are aligned across a picture is a tile row boundary. The 0-th such horizontal boundary where horizontal brick boundaries are aligned across a picture is the top boundary of the picture.

Indicating Tile Columns to be Identically Partitioned to Bricks

In some example embodiments, the syntax comprises an indication that a tile column is partitioned to bricks identically to the previous tile column in the loop entry order (e.g. scanning tile columns from left to right). It needs to be understood that embodiments similarly apply without the indication or any similar indication. For example, the scan order of tile columns may be from right to left, and consequently it may be indicated that the brick partitioning of a current tile column is copied from the tile column on the right side. In another example, it is indicated or inferred that all tile columns with an equal width have the same brick partitioning. In yet another example, an index of a tile column from which the brick partitioning is copied is indicated. It also needs to be understood that embodiments similarly apply when another way to conclude partitioning of a tile column to bricks based on earlier indications. This section presents some related embodiments.

In an embodiment, the encoder indicates in or along the bitstream and/or the decoder decodes from or along the bitstream whether all tile columns that have the same width (e.g. in CTBs) have the same partitioning to bricks. For example, a syntax element called same_brick_spacing_in_equally_wide_tile_cols_flag may be used.

In an embodiment, the encoder indicates in or along the bitstream and/or the decoder decodes from or along the bitstream the number of adjacent tile columns in the loop entry order (e.g. scanning tile columns from left to right) that have the same brick partitioning. For example, a syntax element, which may e.g. be called num_tile_cols_with_same_brick_partitioning_minus1[i], may be u(v) coded, where the v is determined by the remaining tile columns for which brick partitioning is not indicated yet.

In an embodiment, an encoder may indicate in or along the bitstream and/or a decoder may decode from or along the bitstream whether syntax element(s) related to indicating tile columns being identically partitioned to bricks (e.g. copy_previous_col_flag[i]) are present. In an embodiment, the indication is in a sequence-level syntax structure, such as SPS. In another embodiment, the indication is in a picture-level syntax structure, such as PPS. In an embodiment, it is pre-defined e.g. in a coding standard that the absence of syntax element(s) related to indicating tile columns being identically partitioned to bricks causes the brick partitioning to be indicated and/or decoded for all tile columns one by one. In an embodiment, it is pre-defined e.g. in a coding standard that the absence of syntax element(s) related to indicating tile columns being identically partitioned to bricks causes the brick partitioning to be indicated and/or decoded for one tile column and inferred to be the same for all tile columns. In an embodiment, the method to process the absence of syntax element(s) related to indicating tile columns being identically partitioned to bricks is indicated by an encoder in or along the bitstream, e.g. in SPS, and/or decoded by a decoder from or along the bitstream, e.g. from SPS. The method may be indicated and/or decoded among a pre-defined set of processes, which may comprise but might not be limited to i) the brick partitioning to be indicated and/or decoded for all tile columns one by one, and ii) the brick partitioning to be indicated and/or decoded for one tile column and inferred to be the same for all tile columns.

Thus, the syntax and semantics for signaling the tile and brick partitioning according to the embodiments provides significant savings in the number of syntax elements and syntax lines needed for carrying out the signaling. As a result, significant savings are achieved in the number of bits required for indicating the tile and brick partitioning.

These benefits are illustrated by a following example, where three different tile and brick partitionings, shown in FIGS. 9a, 9b and 9c, are used for comparing the performance of the tile and brick partitioning according to VVC Draft 5 and the tile and brick partitioning according to the embodiments.

FIGS. 10a and 10b present the tile and brick partitionings that achieve the 6K effective equirectangular projection (ERP) and cubemap projection (CMP) schemes (respectively) that are described in Omnidirectional Media Format (OMAF, ISO/IEC 23090-2) clauses D.6.3 and D.6.4 (respectively). These schemes have been recommended in the VR Industry Forum Guidelines. The scheme presented in FIG. 10c is otherwise equivalent to that in FIG. 10b but uses a different picture aspect ratio.

The following properties were derived from VVC Draft 5 and the embodiment combining both indicating tile columns and tile-column-wise brick heights and unified signaling of explicit/uniform tile/brick partitioning:

The number of syntax elements for indicating tile and brick partitioning

The number of syntax lines for indicating tile and brick partitioning

The number of bits required for indicating the tile and brick partitioning for the schemes included in the figure below The bit count saving in percent provided by the embodiment when compared to VVC Draft 5 for the schemes presented in the figure below.

The properties derived with 128×128 luma CTB size are presented in the table below.

According to an embodiment for decoding, uncoded tiles or bricks are is decoded from a syntax structure above the slice data from or along a bitstream. No syntax elements are decoded for uncoded tiles or bricks from the slice data. Uncoded tiles or bricks are decoded (e.g. into a decoded reference picture) using a pre-defined or indicated method, such as setting the reconstructed sample values to 0 in the sample arrays.

According to an embodiment applicable to encoding and/or decoding, the number of uncoded bricks is indicated and/or decoded for a tile column, e.g. using a variable-length codeword, such as ue(v). The bricks in the tile column are traversed in a pre-defined scan order (e.g. from bottom to top). For each traversed brick, a flag is indicated and/or decoded to conclude whether or not the brick is uncoded. If the brick is uncoded, the number of bricks left to be assigned as uncoded is decremented by 1. The process is continued until there are no bricks left to be assigned as uncoded.

Figure 11:
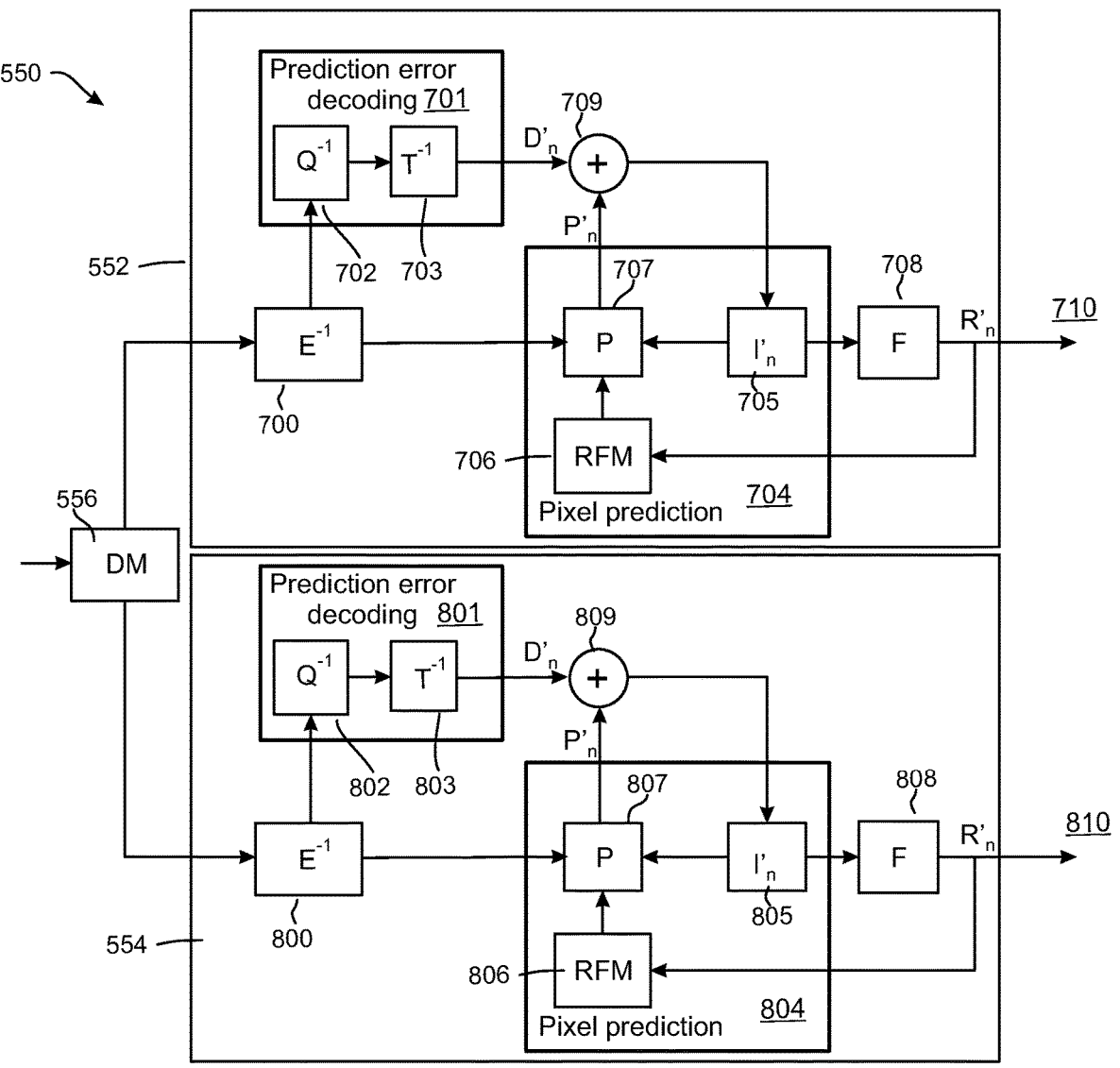
FIG. 11 shows a schematic diagram of a decoder suitable for implementing embodiments of the invention.

FIG. 11 shows a block diagram of a video decoder suitable for employing embodiments of the invention. FIG. 11 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a recon-

| | # syntax elements | # syntax lines | 6K effective ERP | | 6K effective CMP 3 × 6 tile grid | | Effective 6K CMP 6 × 3 tile grid | |
|---|---|---|---|---|---|---|---|---|
| | | | # bits | #bits saving | # bits | #bits saving | # bits | #bits saving |
| WC Draft 5 | 13 | 26 | 74 | | 54 | | 84 | |
| Proposal | 7 | 20 | 33 | 55% | 24 | 56% | 28 | 67% |

Consequently, it can be seen that the number of syntax elements is reduced from 13 to 7 and the number of required syntax lines is reduced from 26 to 20. The bit count saving provided by the embodiment for each of the tile and brick partitioning of FIGS. 10a-10c is more than 50% when compared to VVC Draft 5. It is also remarked that with the proposal the semantics and derivation processes also become shorter.

Indicating Uncoded Tiles or Bricks

In some applications it could be reasonable to assign the content to be encoded and/or decoded to tiles and/or bricks in a manner that only a subset of tiles and/or bricks are occupied. For example, in viewport-dependent streaming of 360-degree video, only a subset of independently coded picture regions, such as tiles, may be received. In another example, a patch-based encoding of volumetric or point cloud video is applied, and the patches occupy only a subset of the tiles and/or bricks of the picture.

According to an embodiment for encoding, uncoded tiles or bricks are indicated in a syntax structure above the slice data in or along a bitstream. No syntax elements are encoded for uncoded tiles or bricks into the slice data. Uncoded tiles or bricks are reconstructed (e.g. into a decoded reference picture) using a pre-defined or indicated method, such as setting the reconstructed sample values to 0 in the sample arrays.

structed prediction error signal. Blocks 704, 804 illustrate preliminary reconstructed images (I'n). Reference R'n stands for a final reconstructed image. Blocks 703, 803 illustrate inverse transform (T⁻¹). Blocks 702, 802 illustrate inverse quantization (Q⁻¹). Blocks 701, 801 illustrate entropy decoding (E⁻¹). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the preliminary reconstructed images (I'n). Preliminary reconstructed and filtered base layer images may be output 709 from the first decoder section 552 and preliminary reconstructed and filtered base layer images may be output 809 from the first decoder section 554.

Herein, the decoder should be interpreted to cover any operational unit capable to carry out the decoding operations, such as a player, a receiver, a gateway, a demultiplexer and/or a decoder.

FIG. 12 shows a flow chart of the operation of the decoder according to an embodiment of the invention. The decoding operations of the embodiments are otherwise similar to the encoding operations, except that the decoder decodes the indications from the. Thus, the decoding method comprises decoding (1200) a bitstream portion comprising an indication of tile columns and an indication of brick heights for one or more tile columns at a time; inferring (1202), upon detecting brick rows aligned through a picture, potential tile rows; inferring (1204) that or decoding an indication whether a boundary of a potential tile row is a boundary of a tile row; and decoding (1206) one or more pictures from the bitstream using the indicated tile columns, the indicated or inferred tile rows, and the indicated brick heights, wherein the one or more pictures are partitioned into a grid of tiles along the indicated tile columns and the indicated or inferred tile rows, a tile in the grid of tiles comprises an integer number of coding tree units and is partitioned into one or more bricks, wherein a brick comprises an integer number of rows of coding tree units within a tile.

FIG. 13 shows a flow chart of the operation of the decoder according to another embodiment of the invention. The decoding method comprises the steps of a) decoding (1300) an indication of a number of partitions to be assigned; b) determining (1302) a number of units to be assigned to the partitions; c) determining (1304) if the number of units to be assigned is assigned evenly to said number of partitions; and if not, d) determining (1306) a number of units to be assigned to a next partition, and e) repeating (1308) steps c) and d) until all units have been assigned to a partition.

Indicating Partitioning of a Picture to Rectangular Slices

Embodiments for improved methods for encoding and/or decoding signalling of rectangular slices are introduced in the next paragraphs. The embodiments may be applied together with or independently of embodiments for tile and brick partitioning. The embodiments are based on definitions and characteristics of tiles, bricks, and rectangular slices as specified in VVC Draft 5. With the embodiments, the bit count required for indicating rectangular slices (e.g. indicating or deriving the location, width, and height of rectangular slices) is reduced.

An encoding method according to a first aspect comprises indicating, in or along a bitstream, or inferring a location of a top-left brick of a rectangular slice; concluding from the location if the rectangular slice comprises one or more bricks of a tile; if the rectangular slice comprises one or more bricks of a tile, indicating, in or along the bitstream, or inferring the number of bricks in the rectangular slice.

A decoding method according to a first aspect comprises decoding, from or along a bitstream, or inferring a location of a top-left brick of a rectangular slice; concluding from the location if the rectangular slice comprises one or more bricks of a tile; if the rectangular slice comprises one or more bricks of a tile, decoding, from or along the bitstream, or inferring the number of bricks in the rectangular slice.

The location of a brick may be e.g. a brick index in the brick scan of a picture.

In an embodiment applicable to encoding and/or decoding, when the location of the top-left brick of the rectangular slice is not the top-left brick of any tile, it is concluded that the rectangular slice comprises one or more bricks of a tile.

In an embodiment applicable to encoding and/or decoding, when the location of the top-left brick of the rectangular slice is the top-left brick of a tile and the tile comprises multiple bricks, it is concluded that the rectangular slice may comprise either bricks of a tile or complete tiles. In an embodiment applicable to encoding, if it is concluded that the rectangular slice may comprise either bricks of a tile or complete tiles, it is indicated in or along the bitstream whether the rectangular slice comprises bricks of a tile or complete tiles. In an embodiment applicable to decoding, if it is concluded that the rectangular slice may comprise either bricks of a tile or complete tiles, it is decoded from or along the bitstream whether the rectangular slice comprises bricks of a tile or complete tiles.

In an embodiment applicable to encoding and/or decoding, if it is inferred or indicated (as part of encoding) or decoded that the rectangular slice comprises bricks of a tile, a variable, e.g. called numDeltaValues, is set equal to the number of bricks subsequent to the location of the top-left brick of the rectangular slice and within the same tile. If numDeltaValues is equal to 1, it is inferred that the rectangular slice contains exactly one brick. Otherwise, the variable numDeltaValues is used in deriving the syntax element length for a first syntax element indicating the bottom-right brick of the rectangular slice or for a second syntax element indicating the number of bricks in the rectangular slice or for a third syntax element indicating the height (in bricks) of the rectangular slice or any similar syntax element. For example, the first or second or third syntax element or any similar syntax element may be u(v)-coded and its length is Ceil(Log 2(numDeltaValues)) bits.

In an example embodiment, the following syntax is used:

| | Descriptor |
|---|---|
| pic_parameter_set_rbsp( ) { | |
| ... | |
|    if( rect_slice_flag && | |
|    !single_brick_per_slice_flag ) { | |
|       num_slices_in_pic_minus1 | ue(v) |
|       for( i = 0; i <= num_slices_in_pic_minus1; i++ ) { | |
|         if( i > 0 ) | |
|           top_left_brick_idx[ i ] | u(v) |
|         if( numDeltaValues > 0 ) | |
|           bottom_right_brick_idx_delta[ i ] | u(v) |
|       } | |
|    } | |
| } | |

Semantics of syntax elements may be specified as described earlier, except that bottom_right_brick_idx_delta[i] specifies the difference between the brick index of the brick located at the bottom-right corner of the i-th slice and top_left_brick_idx[i]. When single_brick_per_slice_flag is equal to 1, the value of bottom_right_brick_idx_delta[i] is inferred to be equal to 0. When not present, the value of bottom_right_brick_idx_delta[i] is inferred to be equal to 0. The variable numDeltaValues, which specifies the number of values that bottom_right_brick_idx_delta[i] may have, is derived as follows:

| |
|---|
|   if( BrickIdxInTile[ brIdx ] > 0 ) |
|     numDeltaValues = |
|     NumBricksInTile[ top_left_brick_ idx[ i ] ] – |
|     BrickIdxInTile[ top_left_brick_idx[ i ] ] |
|   else |
|     numDeltaValues = NumBricksInPic – top_left_brick_idx[ i ] |

The length of the bottom_right_brick_idx_delta[i] syntax element is Ceil(Log 2(numDeltaValues)) bits. The variable NumBricksInTile[brickIdx] specifies the number of bricks in the tile that contains the brick with index brickIdx in the brick scan of a picture. The variable BrickIdxInTile[brickIdx] specifies the index of the brick within in the tile that contains the brick, when the brick is identified by index brickIdx in the brick scan of a picture.

In an embodiment applicable to encoding and/or decoding, a location of a top-left brick of a rectangular slice is inferred. At the beginning, all brick locations are marked vacant. A loop of assigning bricks to rectangular slices is included in or along the bitstream or decoded from or along the bitstream. For each loop entry, the top-left brick of a rectangular slice is inferred to be the next vacant brick location in a pre-defined, indicated, or decoded scan order. For example, it may be pre-defined e.g. in a coding standard that the brick scan order within the picture is used. The bottom-right brick of a rectangular slice may be inferred, indicated, or decoded e.g. as described above, and the bricks forming the rectangle cornered by the top-left brick and the bottom-right brick are marked as allocated. The same or similar process is repeated for each loop entry.

In an embodiment applicable to encoding and/or decoding, when it is concluded (as part of encoding or decoding) or indicated (as part of encoding) or decoded (as part of decoding) that a rectangular slice comprises complete tiles, the syntax element to indicate the bottom-right brick of the rectangular slice is derived from one or more of the following:

A set of possible bottom-right brick locations is derived. The set may comprise only those brick locations that are the last brick locations within a tile, are located at or below the tile row containing the top-left brick of the rectangular slice, are located at or on the right of the rile column containing the top-left brick of the rectangular slice, and enclose a rectangular set of vacant tile locations (not yet allocated to any rectangular slice).

The entries in the set of possible bottom-right brick locations are indexed or enumerated.

The length of the u(v)-encoded syntax element to indicate the bottom-right brick of the rectangular slice is derived from the number of entries in the set of possible bottom-right brick locations. If the number of entries numEnt is equal to 1, the bottom-right brick index need not be indicated or decoded. Otherwise, the length of the syntax element is equal to Ceil(Log 2(numEnt)) bits.

The syntax element to indicate the bottom-right brick of the rectangular slice is an index to the enumerated set of possible bottom-right brick locations.

rectangular slice be equal to one tile column, and otherwise indicating, in or along the bitstream, the width of the rectangular slice in tile columns;

if the rectangular slice comprises one or more bricks of a tile, indicating, in or along the bitstream, or inferring the number of bricks in the rectangular slice; otherwise if the top-left brick is on the bottom-most tile row, inferring the height of the rectangular slice be equal to one tile row, and otherwise indicating, in or along the bitstream, the height of the rectangular slice in tile rows.

An decoding method according to a second aspect comprises decoding, from or along a bitstream, or inferring a location of a top-left brick of a rectangular slice;

concluding from the location if the rectangular slice comprises one or more bricks of a tile;

if the rectangular slice comprises one or more bricks of a tile, inferring a width of the rectangular slice be equal to one tile column, otherwise if the top-left brick is on the right-most tile column, inferring the width of the rectangular slice be equal to one tile column, and otherwise decoding, from or along the bitstream, the width of the rectangular slice in tile columns;

if the rectangular slice comprises one or more bricks of a tile, decoding, from or along the bitstream, or inferring the number of bricks in the rectangular slice; otherwise if the top-left brick is on the bottom-most tile row, inferring the height of the rectangular slice be equal to one tile row, and otherwise decoding, from or along the bitstream, the height of the rectangular slice in tile rows.

In an embodiment applicable to encoding and/or decoding and applicable to the first aspect and/or the second aspect, the number of bricks in a rectangular slice is inferred to be equal to 1 (in bricks), when it has been concluded or indicated or decoded that the rectangular slice contains bricks of a tile and either the tile contains two bricks and the current brick (i.e. the top-left brick of a rectangular slice) is the top brick of the tile, or the current brick is the bottom-most brick of a tile.

In an example embodiment, the following syntax is used:

| | Descriptor |
|---|---|
| if( !single_brick_per_slice_flag ) { | |
|   num_slices_in_pic_minus1 | ue(v) |
|   for( i = 0; i < num_slices_in_pic_minus1; i++ ) { | |
|     if( BrickIdxInTile[ tlBrickIdx ] = = 0 && numFreeColumnsOnTheRight[ tlBrickIdx ] > 1 ) | |
|       slice_width_minus1[ i ] | u(v) |
|     if( slice_width_minus1[i] = = 0 && BrickIdxInTile[ tlBrickIdx ] = = 0 | |
|       && NumBricksInTile[ tlBrickIdx ] > 1 ) | |
|       full_tiles_in_slice_flag[ i ] | u(1) |
|     if( numFreeRowsBelow[ tlBrickIdx ] > 1 ) { | |
|       slice_height_minus1[ i ] | u(v) |
|     } | |
|   } | |
| } | |

An encoding method according to a second aspect comprises indicating, in or along a bitstream, or inferring a location of a top-left brick of a rectangular slice;

concluding from the location if the rectangular slice comprises one or more bricks of a tile;

if the rectangular slice comprises one or more bricks of a tile, inferring a width of the rectangular slice be equal to one tile column, otherwise if the top-left brick is on the right-most tile column, inferring the width of the Variables and semantics of syntax elements may be specified as described earlier with the following additions:

tlBrickIdx may be specified as the next vacant brick location in a pre-defined scan order, such as the brick scan in a picture, as described earlier. tlBrickIdx is re-derived for each value of i, i.e. for each loop entry.

numFreeColumnsOnTheRight[brickIdx] is a variable indicating the number of tile columns on the right of the brick with index brickIdx.

slice_width_minus1[i] plus 1 specifies the width of the i-th rectangular slice in tile columns. When not present, slice_width_minus1[i] is inferred to be equal to 0.

full_tiles_in_slice_flag[i] equal to 0 specifies that the i-th rectangular slice contains one or more bricks of a single tile. full_tiles_in_slice_flag[i] equal to 1 specifies that the i-th rectangular slice contains one or more complete tiles. full_tiles_in_slice_flag[i] is inferred to be equal to 0, when BrickIdxInTile[tlBrickIdx] is greater than 0 (i.e. when the top-left brick of the rectangular slice is not a top-left brick of any tile). full_tiles_in_slice_flag[i] is inferred to be equal to 1, when slice_width_minus1[i] is greater than 0 or when BrickIdxInTile[tlBrickIdx] is equal to 0 and NumBricksInTile[tlBrickIdx] is equal to 1.

If full_tiles_in_slice_flag[i] is equal to 0, numFreeRowsBelow[brickIdx] is a variable indicating the number of bricks in a tile below the brick with index brickIdx in the same tile. Otherwise, numFreeRowsBelow[brickIdx] is a variable indicating the number of tile rows below the tile containing the brick with index brickIdx.

If full_tiles_in_slice_flag[i] is equal to 0, slice_height_minus1[i] plus 1 specifies the height of the i-th rectangular slice in bricks. Otherwise, slice_height_minus1[i] plus 1 specifies the height of the i-th rectangular slice in tile rows. When not present, slice_height_minus1[i] is inferred to be equal to 0.

In an embodiment applicable to encoding and/or decoding, the length of the slice width syntax element (e.g. slice_width_minus1) is derived from the number of possible values based on the top-left brick location of the rectangular slice. Using the variables and syntax elements above, the length of slice_width_minus1 is equal to Ceil(Log 2(numFreeColumnsOnTheRight[tlBrickIdx]+1)).

In an embodiment applicable to encoding and/or decoding, the length of the slice height syntax element (e.g. slice_height_minus1) is derived from the number of possible values based on the top-left brick location of the rectangular slice and whether the rectangular slice comprises bricks of a single tile or complete tiles. Using the variables and syntax elements above, the length of slice_height_minus1 is equal to Ceil(Log 2(numDeltaValues)), where numDeltaValues is derived as follows:

```
if( full_tiles_in_slice_flag[ i ] = = 0)
    numDeltaValues = NumBricksInTile[ tlBrickIdx ] –
    BrickIdxInTile[ tlBrickIdx ]
else
    numDeltaValues = numFreeRowsBelow[ tlBrickIdx ] + 1
```

Indicating Uncoded Rectangular Slices

In some applications it could be reasonable to assign the content to be encoded and/or decoded to rectangular slices in a manner that only a subset of rectangular slices are occupied. For example, in viewport-dependent streaming of 360-degree video, only a subset of rectangular slices may be received. In another example, a patch-based encoding of volumetric or point cloud video is applied, and the patches occupy only a subset of the rectangular slices of the picture.

According to an embodiment for encoding, uncoded rectangular slices are indicated in or along a bitstream, e.g. in PPS. Uncoded rectangular slices are not encoded as VCL NAL units into the bitstream. Uncoded rectangular slices are reconstructed (e.g. into a decoded reference picture) using a pre-defined or indicated method, such as setting the reconstructed sample values to 0 in the sample arrays.

According to an embodiment for decoding, uncoded rectangular slices are decoded from or along a bitstream, e.g. from PPS. Uncoded rectangular slices are not decoded from VCL NAL units from the bitstream. Instead, uncoded rectangular slices are decoded (e.g. into a decoded reference picture) using a pre-defined or indicated method, such as setting the decoded sample values to 0 in the sample arrays.

According to an embodiment applicable to encoding and/or decoding, a flag is indicated and/or decoded for each rectangular slice, the flag being indicative of whether the rectangular slice is uncoded or not.

According to an embodiment, the number of uncoded rectangular slices is indicated and/or decoded using a variable-length codeword, such as ue(v). The rectangular slices are traversed in a pre-defined scan order (in a reverse raster scan order of the top-left CTUs of the rectangular slices). For each traversed rectangular slice, a flag is indicated and/or decoded to conclude whether or not the rectangular slice is uncoded. If the rectangular slice is uncoded, the number of rectangular slices left to be assigned as uncoded is decremented by 1. The process is continued until there are no rectangular slices left to be assigned as uncoded.

Figure 14:
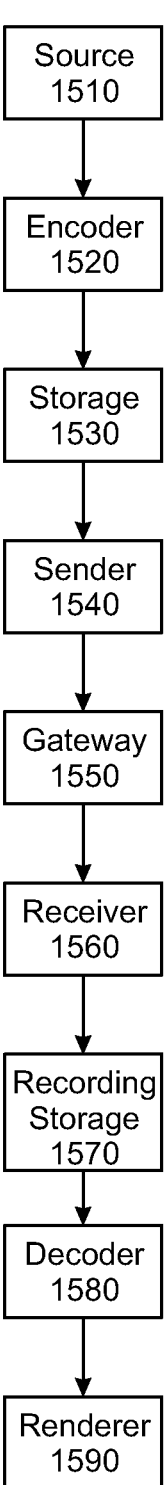
FIG. 14 shows a schematic diagram of an example multimedia communication system within which various embodiments may be implemented.

FIG. 14 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additionally comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

In the above, some embodiments have been described with reference to and/or using terminology of VVC/H.266. It needs to be understood that embodiments may be similarly realized with any video encoder and/or video decoder.

In the above, some example embodiments have been described with reference to specific syntax structures and/or syntax elements. It needs to be understood that embodiments may be similarly realized with other syntax structures and/or syntax elements. For example, when embodiments have been described with reference to syntax elements in the PPS syntax, it needs to be understood that embodiments may be realized with the same or similar syntax elements in another syntax structures, such as SPS.

In the above, some embodiments have been described with reference to the term indicating. It needs to be understood that the term indicating may be understood as encoding or generating one or more syntax elements in one or more syntax structures in or along a bitstream.

In the above, some embodiments have been described with reference to the term decoding. It needs to be understood that the term decoding may be understood as decoding or parsing one or more syntax elements from one or more syntax structures from or along a bitstream.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

For example, some embodiments have been described related to generating a prediction block as part of encoding. Embodiments can be similarly realized by generating a prediction block as part of decoding, with a difference that coding parameters, such as the horizontal offset and the vertical offset, are decoded from the bitstream than determined by the encoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:

performing an encoding process for encoding a picture of a video into a bitstream, the encoding process comprising:

determining a number of units to be assigned to partitions of tile columns or tile rows for encoding the picture of the video, wherein the number of units to be assigned to the partitions is one of the following: a picture width in coding tree units (CTUs), or a picture height in CTUs;

indicating a number of explicitly sized partitions of the tile columns or the tile rows within the picture;

indicating sizes for or a number of units in the explicitly sized partitions of the tile columns or the tile rows;

inferring a number of evenly sized partitions to be formed within the picture, wherein the evenly sized partitions are from the tile columns of the tile rows and have a size corresponding to a number of units that is different from a size corresponding to the number of units assigned to one of the explicitly sized partitions according to a pre-defined or indicated scan order, at least by determining a number of units yet to be assigned to the partitions by decrementing the number of units in the explicitly sized partitions from the number of units to be assigned to the partitions;

assigning partitions of the picture to the explicitly sized partitions of the tile columns or the tile rows according to sizes for, or the number of units in, the explicitly sized partitions and according to the pre-defined or indicated scan order;

assigning partitions of the picture to form the evenly sized partitions by dividing the units yet to be assigned to the partitions by the inferred number of evenly sized partitions and according to the pre-defined or indicated scan order;

using the assigned partitions to encode the picture of the video as part of the bitstream; and outputting the bitstream.

2. An apparatus comprising a processor, a memory, and a computer program code residing in the memory, wherein the computer code when executed by the processor, is configured to cause the apparatus to:

perform an encoding process for encoding a picture of a video into a bitstream, the encoding process comprising:

determine a number of units to be assigned to partitions of tile columns or tile rows, wherein the number of units to be assigned to the partitions is one of the following: the picture width in coding tree units (CTUs), or the picture height in CTUs;

indicate a number of explicitly sized partitions of the tile columns or the tile rows within the picture;

indicate sizes for or a number of units in the explicitly sized partitions of the tile columns or the tile rows;

infer a number of evenly sized partitions to be formed within the picture, wherein the evenly sized partitions are from the tile columns or the tile rows and have a size corresponding to a number of units that is different from a size corresponding to the number of units assigned to one of the explicitly sized partitions according to a pre-defined or indicated scan order, at least by determining a number of units yet to be assigned to the partitions by decrementing the number of units in the explicitly sized partitions from the number of units to be assigned to the partitions;

assigning partitions of the picture to the explicitly sized partitions of the tile columns or the tile rows according to the sizes for or the number of units in the explicitly sized partitions and according to the pre-defined or indicated scan order;

assigning partitions of the picture to form the evenly sized partitions by dividing the units yet to be assigned to the partitions by the inferred number of evenly sized partitions and according to the pre-defined or indicated scan order;

using the assigned partitions to encode the picture of the video as part of the bitstream; and outputting the bitstream.

3. A method comprising:

performing a decoding process for decoding information from a bitstream into a picture of a video, the decoding process comprising:

determining a number of units to be assigned to partitions of tile columns or tile rows, wherein the number of units to be assigned to the partitions is one of the following: the picture width in coding tree units (CTUs), or the picture height in CTUS;

decoding a number of explicitly sized partitions of the tile columns or the tile rows within the picture;

decoding sizes for or a number of units in the explicitly sized partitions of the tile columns or the tile rows;

inferring a number of evenly sized partitions to be formed within the picture, wherein the evenly sized partitions are from the tile columns or tile rows and have a size corresponding to a number of units that is different from a size corresponding to the number of units assigned to one of the explicitly sized partitions according to a pre-defined or indicated scan order, at least by determining a number of units yet to be assigned to the partitions by decrementing the number of units in the explicitly sized partitions from the number of units to be assigned to the partitions;

assigning partitions of the picture to the explicitly sized partitions of the tile columns or the tile rows according to sizes for, or the number of units in, the explicitly sized partitions and according to the pre-defined or indicated scan order;

assigning partitions of the picture to form the evenly sized partitions by dividing the units yet to be assigned to the partitions by the inferred number of evenly sized partitions and according to the pre-defined or indicated scan order;

using the assigned partitions to decode the information into a picture of the video; and outputting the picture.

4. An apparatus comprising a processor, a memory, and a computer program code residing in the memory, wherein the computer code when executed by the processor, is configured to cause the apparatus to perform a decoding process for decoding information from a bitstream into a picture of a video, the decoding process comprising:

determine a number of units to be assigned to partitions of tile columns or tile rows, wherein the number of units to be assigned to the partitions is one of the following: the picture width in coding tree units (CTUs), or the picture height in CTUS;

decode a number of explicitly sized partitions of the tile columns or the tile rows within the picture;

decode sizes for or a number of units in the explicitly sized partitions of the tile columns or the tile rows;

infer a number of evenly sized partitions to be formed within the picture, wherein the evenly sized partitions are from the tile columns or tile rows and have a size corresponding to a number of units that is different from a size corresponding to the number of units assigned to one of the explicitly sized partitions according to a pre-defined or indicated scan order, at least by determining the number of units yet to be assigned to the partitions by decrementing the number of units in the explicitly sized partitions from the number of units to be assigned to the partitions;

assign partitions of the picture to the explicitly sized partitions of the tile columns or the tile rows according to sizes for, or the number of units in, the explicitly sized partitions and according to the pre-defined or indicated scan order;

assign partitions of the picture to form the evenly sized partitions by dividing the units yet to be assigned to the partitions by the number of evenly sized partitions and according to the pre-defined or indicated scan order;

use the assigned partitions to decode the information into a picture of the video; and output the picture.

*  *  *  *  *